(12) United States Patent
Kim et al.

(10) Patent No.: US 9,191,826 B2
(45) Date of Patent: Nov. 17, 2015

(54) METHOD AND APPARATUS FOR TRANSCEIVING A CONTACT VERIFICATION SIGNAL REGARDING AVAILABLE CHANNELS IN A PLURALITY OF LOCATIONS IN A WIRELESS COMMUNICATION SYSTEM

(75) Inventors: Eunsun Kim, Anyang-si (KR); Dae Sik Hong, Seoul (KR); Ji-Haeng Heo, Seoul (KR); Gosan Noh, Hwaseong-si (KR); Yongho Seok, Anyang-si (KR); Jihyun Lee, Anyang-si (KR)

(73) Assignees: LG ELECTRONICS INC., Seoul (KR); INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 10 days.

(21) Appl. No.: 14/232,219

(22) PCT Filed: Dec. 22, 2011

(86) PCT No.: PCT/KR2011/009986
§ 371 (c)(1),
(2), (4) Date: Jan. 10, 2014

(87) PCT Pub. No.: WO2013/012140
PCT Pub. Date: Jan. 24, 2013

(65) Prior Publication Data
US 2014/0135032 A1 May 15, 2014

Related U.S. Application Data

(60) Provisional application No. 61/508,074, filed on Jul. 15, 2011.

(51) Int. Cl.
*H04W 72/00* (2009.01)
*H04W 16/14* (2009.01)
*H04W 72/08* (2009.01)

(52) U.S. Cl.
CPC .......... *H04W 16/14* (2013.01); *H04W 72/082* (2013.01)

(58) Field of Classification Search
CPC ... H04W 16/14; H04W 72/082; H04W 72/04; H04W 28/16
USPC .................. 455/450, 454, 442, 509; 370/329
See application file for complete search history.

(56) References Cited

U.S. PATENT DOCUMENTS

| | | | | |
|---|---|---|---|---|
| 8,483,155 B1 * | 7/2013 | Banerjea et al. | ............... | 370/329 |
| 2008/0318579 A1 * | 12/2008 | McCoy et al. | ................ | 455/442 |

(Continued)

OTHER PUBLICATIONS

Lee, et al., "Normative Text for Fixed TVBD identifying information," IEEE P802.11 Wireless LANs, IEEE 802.11-11/0403r1, May 2011, 5 pages (relevant pages: p. 3-5).
Kim, "11af Architecture," IEEE 802.11 Wireless LAN, IEEE 802.11-11/0674r1, May 2011, 15 pages (relevant pages: p. 3-7).

(Continued)

*Primary Examiner* — Kashif Siddiqui
*Assistant Examiner* — Mong-Thuy Tran
(74) *Attorney, Agent, or Firm* — Lee, Hong, Degerman, Kang & Waimey

(57) ABSTRACT

The present invention relates to a method of receiving available channel information on K (K≥2) numbers of locations by a first type station (STA) from a second type STA in a wireless communication system includes: receiving a channel availability query (CAQ) response message, wherein the CAQ response message includes a field of the numbers (K) of the locations and K numbers of available channel list fields configured with information on an available channel list for each of the K numbers of locations, from the second type STA, and performing a communication in a white space using an available channel included in an available channel list for a single location among the K numbers of locations, wherein the K numbers of available channel list fields are configured with a Map ID field and a field of N (N≥1) numbers of available channels are repeated K times.

13 Claims, 20 Drawing Sheets

(56) References Cited

U.S. PATENT DOCUMENTS

| | | | | |
|---|---|---|---|---|
| 2009/0298522 | A1* | 12/2009 | Chaudhri et al. | 455/509 |
| 2011/0143761 | A1* | 6/2011 | Uusitalo et al. | 455/450 |
| 2011/0286401 | A1* | 11/2011 | Wijting et al. | 370/329 |
| 2011/0299481 | A1* | 12/2011 | Kim et al. | 370/329 |
| 2011/0317632 | A1* | 12/2011 | Bahl et al. | 370/329 |
| 2012/0108179 | A1* | 5/2012 | Kasslin et al. | 455/67.13 |
| 2012/0281593 | A1* | 11/2012 | Stewart et al. | 370/259 |
| 2012/0281637 | A1* | 11/2012 | Junell | 370/329 |
| 2012/0282959 | A1* | 11/2012 | Abraham et al. | 455/500 |
| 2013/0143613 | A1* | 6/2013 | Lee et al. | 455/509 |

OTHER PUBLICATIONS

Sun, et al., "Comment resolutions regarding to Network channel control SAP and frame format," IEEE P802.11 Wireless LANs, IEEE 802.11-11/0716r4, Jul. 2011, 13 pages (relevant pages: p. 7-13).

Kim, "Discussion on WSM length comments," IEEE 802.11 Wireless LAN, IEEE 802.11-11/0885r0, Jun. 2011, 8 pages (relevant pages: p. 7).

PCT International Application No. PCT/KR2011/009986, Written Opinion of the International Searching Authority dated Jul. 25, 2012, 16 pages.

\* cited by examiner

FIG. 5
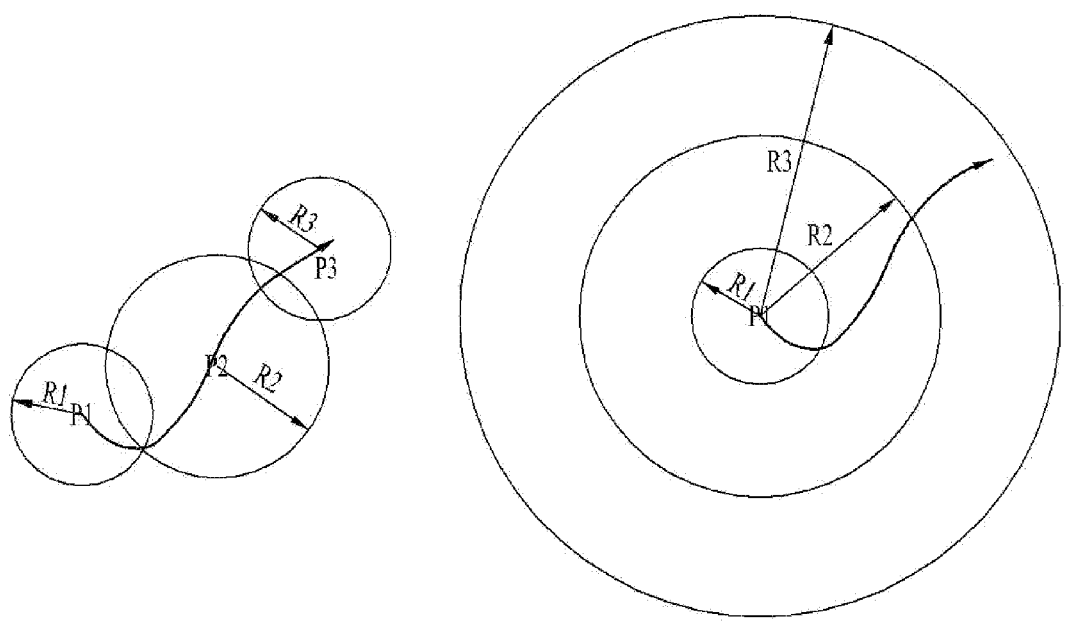
(a)  (b)
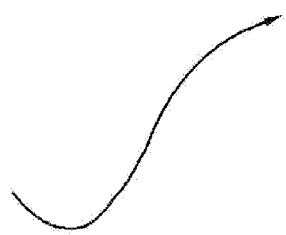
Anticipated Moving Path

FIG. 6

| Category | Public Action | Reason Result Code | Length | Map ID | Channel number | Maximum Power level | validity |
|---|---|---|---|---|---|---|---|

Octets: 1, 1, 1, 1, 1, 1, 1, 1

These three fields can be repeated (Channel number, Maximum Power level, validity)

FIG. 7

| Element ID | Length | Map ID |
|---|---|---|

Octets: 1, 1, 1

FIG. 8

| Category | Public Action | Reason Result Code | Number of locations | Length | Map ID | Channel number | Maximum Power level | validity |
|---|---|---|---|---|---|---|---|---|
| 1 | 1 | 1 | 1 | 1 | 1 | 1 | 1 | 1 |

Octets:

These three fields can be repeated by N

These fields can be repeated by K

| Info ID | Length | Requester STA Address | Responder STA Address | Reason Result Code | Channel Query Info | Device Class | Device Identification Information | Device Location Information | WSM element body fields |
|---|---|---|---|---|---|---|---|---|---|
| | | | | | | | | Device Location Information is repeated | |
| Octets: 1 | 2 | 6 | 6 | 1 | 1 | Variable | Variable | Variable | Variable |

(b)

| Info ID | Length | Requester STA Address | Responder STA Address | Reason Result Code | Channel Query Info | Device Class | Device Identification Information | Device Location Information | WSM element body fields |
|---|---|---|---|---|---|---|---|---|---|
| | | | | | | | | These two fields are repeated / Device Location Information is repeated | |
| Octets: 1 | 2 | 6 | 6 | 1 | 1 | Variable | Variable | Variable | Variable |

| B0 | B1　　　B3 | B4　　　　B7 |
|---|---|---|
| Device Identification Information Present | Number of Device Location Information | Reserved |

Bits: 1, 3, 4

(b)

| B0 | B1 | B2-B4 | B5-B7 |
|---|---|---|---|
| Device Identification Information Present | Multiple Bounded Geographic Area Information Present | Number of Device Location Information | Reserved |

Bits: 1, 1, 3, 3

METHOD AND APPARATUS FOR TRANSCEIVING A CONTACT VERIFICATION SIGNAL REGARDING AVAILABLE CHANNELS IN A PLURALITY OF LOCATIONS IN A WIRELESS COMMUNICATION SYSTEM

CROSS-REFERENCE TO RELATED APPLICATIONS

This application is the National Stage filing under 35 U.S.C. 371 of International Application No. PCT/KR2011/009986, filed on Dec. 22, 2011, which claims the benefit of U.S. Provisional Application Ser. No. 61/508,074, filed on Jul. 15, 2011, the contents of which are hereby incorporated by reference herein in their entirety.

TECHNICAL FIELD

The following description relates to a method of transceiving a contact verification signal regarding available channels in a plurality of locations in a wireless communication system and an apparatus therefor.

BACKGROUND ART

A standard for a wireless local area network (WLAN) technology has been developed as IEEE (Institute of Electrical and Electronics Engineers) 802.11 standard. IEEE 802.11a and IEEE 802.11b use an unlicensed band in 2.4 GHz or 5 GHz, IEEE 802.11b provides transmission speed of 11 Mbps and IEEE 802.11a provides transmission speed of 54 Mbps. IEEE 802.11g provides transmission speed of 54 Mbps in a manner of applying Orthogonal Frequency Division Multiplexing (OFDM) in 2.4 GHz. IEEE 802.11n provides transmission speed of 300 Mbps for 4 spatial streams in a manner of applying Multiple Input Multiple Output-OFDM (MIMO-OFDM). IEEE802.11n supports a channel bandwidth up to 40 MHz. In this case, IEEE802.11n provides transmission speed of 600 Mbps.

Currently, ongoing effort to develop IEEE 802.11af standard has been performed. IEEE 802.11af standard is a standard set to regulate an operation of an unlicensed device in a TV whitespace (TVWS) band.

The TVWS is a frequency band assigned for a TV broadcast and includes a Very High Frequency (VHF) band (54~60 MHz, 76~88 MHz, 174~216 MHz) and an Ultra High Frequency (UHF) band (470~698 MHz). The TVWS means a frequency band permitted to an unlicensed device to use under a condition that the unlicensed device does not impede a communication of a licensed device operating in a corresponding frequency band. The licensed device may include a TV, a wireless microphone, and the like.

Although operations of all unlicensed devices are permitted on 512~608 MHz and 614~698 MHz except several special cases, a communication between fixed devices is only permitted on 54~60 MHz, 76~88 MHz, 174~216 MHz, 470~512 MHz. A fixed device indicates a device performing a transmission at a fixed position only. In the following description, a white space band includes the aforementioned TVWS, by which the present invention may be non-limited.

The unlicensed device wishing to use the TVWS should provide a protection function for a licensed device. Hence, the unlicensed device should check whether the licensed device occupies a corresponding band before starting a transmission in the TVWS. In particular, a use of the unlicensed device is permitted only when the licensed device is not used in the white space band.

To this end, the unlicensed device should obtain channel list information available in a corresponding region in a manner of accessing a geo-location database (GDB) via the internet or a dedicated network. The GDB is a database configured to store and manage channel usage information, which is dynamically changing in accordance with information on licensed devices registered to the GDB, geographical locations of the licensed devices, and hours of use. Moreover, such a signaling protocol as a common beacon frame and the like, a spectrum sensing mechanism, and the like may be used to solve a coexistence problem between the unlicensed devices using a white space.

In IEEE 802.11 system, a TVWS terminal may indicate an unlicensed device operating using IEEE 802.11 MAC (medium access control) layer and a PHY (physical) layer in a TVWS spectrum. Unless there is a separate explanation in the present specification, a station (STA) indicates the TVWS terminal operating in the TVWS spectrum.

The STA should provide a function of protecting an incumbent user, which corresponds to a user to which a preferential access is permitted, including a licensed user (TV, wireless microphone, and the like). In particular, if a TVWS is in use by the incumbent user, the STA should stop using a corresponding channel. Hence, the STA should operate in an available channel in a manner of searching for an available channel (i.e., a channel not used by a licensed device) capable of being used by an unlicensed device.

A method of searching for an available channel, which is searched by the STA, includes a scheme of performing a spectrum sensing mechanism, a scheme of finding out a TV channel schedule by accessing a GDB, and the like. An energy detection scheme (a scheme of judging a use of an incumbent user if a strength of a reception signal is greater than a prescribed value), a feature detection scheme (a scheme of judging a use of an incumbent user if a digital preamble is detected), and the like may be utilized as the spectrum sensing mechanism. Subsequently, the STA obtains GDB information based on location information of the STA in a manner of accessing the GDB and finds out whether a licensed device uses a channel in the corresponding location. Accessing the GDB and obtaining information should be performed with a frequency sufficient enough to protect the licensed device.

If it is judged that an incumbent user uses a channel immediately adjacent to a currently used channel, a user equipment (or STA) and a base station (or access point (AP)) may protect the incumbent user with a scheme of lowering a transmit power.

For instance, detail contents on an operation in a TVWS may refer to 'Second Memorandum Opinion and Order' (FCC, ET Docket No. 10-174, September 2010.) document, 'IEEE 802.22: The first cognitive radio wireless regional area network standard' (C. R. Stevenson, G. Chouinard, Z. Lei, W. Hu, S. J. Shellhammer, and W. Caldwell, IEEE Comm. Mag., pp. 130-138, January 2009) document, 'TVWS PAR and 5C' (IEEE 802.11-09/0934r05, September 2009.) document, and the like.

DISCLOSURE OF THE INVENTION

Technical Tasks

As mentioned in the foregoing description, in order for an STA to operate in a white space band, it is necessary for the STA to obtain information on an available channel in the white space band. In case of an STA not equipped with a function of accessing the GDB, the STA may obtain the information on the available channel from an STA equipped with the function of accessing the GDB. A process of obtaining the information on the available channel is called a channel availability query (CAQ) process. The STA not equipped with the function of accessing the GDB may perform a process of checking whether the available channel is valid after obtaining the information on the available channel. This process is called contact verification and a signal used for the process is called a contact verification signal (CVS).

According to a legacy definition, the STA not equipped with the function of accessing the GDB may obtain an available channel list of a single location only by performing a CAQ process to the STA equipped with the function of accessing the GDB and a validity of an available channel list only may be checked via the CVS. Yet, if an STA having mobility moves to a location to which the obtained available channel list is not applicable, since the CAQ process and the CVS transmission/reception should be newly performed, a network overhead may occur.

Hence, a technical task of the present invention is to provide a method for an STA of precisely and efficiently obtaining information on an available channel in a plurality of locations in a white space band and an apparatus therefor.

Technical tasks obtainable from the present invention are non-limited the above-mentioned technical task. And, other unmentioned technical tasks may be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving available channel information on K (K≥2) numbers of locations by a first type station (STA) from a second type STA in a wireless communication system includes: receiving a channel availability query (CAQ) response message, wherein the CAQ response message includes a field of the numbers (K) of the locations and K numbers of available channel list fields configured with information on an available channel list for each of the K numbers of locations, from the second type STA, and performing a communication in a white space using an available channel included in an available channel list for a single location among the K numbers of locations, wherein the K numbers of available channel list fields are configured with a Map ID field and a field of N (N≥1) numbers of available channels are repeated K times.

To further achieve these and other advantages and in accordance with the purpose of the present invention, according to a different embodiment, a method of transmitting available channel information on K (K≥2) numbers of locations by a second type station (STA) to a first type STA in a wireless communication system includes: generating a channel availability query (CAQ) response message, wherein the CAQ response message includes a field of the numbers (K) of the locations and K numbers of available channel list fields configured with information on an available channel list for each of the K numbers of locations, and transmitting the generated CAQ response message to the first type STA, wherein the K numbers of available channel list fields are configured with a Map ID field and a field of N (N≥1) numbers of available channels are repeated K times.

In order to solve the aforementioned technical task, according to a different embodiment of the present invention, a first type station (STA) device receiving available channel information on K (K≥2) numbers of locations from a second type STA in a wireless communication system includes a transceiver configured to receive a channel availability query (CAQ) response message, wherein the CAQ response message includes a field of the numbers (K) of the locations and K numbers of available channel list fields configured with information on an available channel list for each of the K numbers of locations, from the second type STA, and a processor configured to perform a communication in a white space using an available channel included in an available channel list for a single location among the K numbers of locations, wherein the K numbers of available channel list fields are configured with a Map ID field and a field of N (N≥1) numbers of available channels are repeated K times.

In order to solve the aforementioned technical task, according to a further different embodiment of the present invention, a second type station (STA) transmitting available channel information on K (K≥2) numbers of locations to a first type STA in a wireless communication system includes a processor configured to generate a channel availability query (CAQ) response message, wherein the CAQ response message includes a field of the numbers (K) of the locations and K numbers of available channel list fields configured with information on an available channel list for each of the K numbers of locations and to transmit the generated CAQ response message to the first type STA via a transceiver, wherein the K numbers of available channel list fields are configured with a Map ID field and a field of N (N≥1) numbers of available channels are repeated K times.

In the embodiments according to the present invention, following description may be commonly applied.

The first type STA may receive a contact verification signal (CVS) including one or more Map ID fields from the second type STA.

In this case, if the first type STA receives the CVS within a predetermined time interval (CVSTimeInterval), an available channel list corresponding to a Map ID, which is matched with a Map ID included in the received CVS, may be used only by the first type STA among available channel lists included in the CAQ response message.

An available channel list corresponding to a Map ID, which is not matched with a Map ID included in the received CVS, may be discarded by the first type STA among available channel lists included in the CAQ response message.

If there is no Map ID matched with a Map ID included in the received CVS among available channel lists included in the CAQ response message, the first type STA may transmit a new CAQ request message to the second type STA.

A value of the Map ID may be sequentially given to different available channel lists.

If a value of the Map ID field corresponds to 0, modification of the available channel information may be indicated.

The field of the N numbers of available channels may be configured with a channel number field, a maximum power level field, and a validity field are repeated N times.

The second type STA may obtain the available channel information on the K numbers of locations from a geo-location data base.

The available channel information on the K numbers of locations may be included in an anticipated moving path of the second type STA.

The CAQ response message may correspond to either a response message for a CAQ request message transmitted by the first type STA or an unsolicited response message.

The K numbers of locations may be configured by K numbers of operation ranges including an identical center point and K numbers of different radius information.

The above-mentioned general description for the present invention and the following details of the present invention may be exemplary and are provided for the additional description for the inventions in the appended claims.

Advantageous Effects

According to the present invention, a method for an STA of precisely and efficiently obtaining information on an available channel in a plurality of locations in a white space band and an apparatus therefor may be provided.

Effects obtainable from the present invention may be non-limited by the above mentioned effect. And, other unmentioned effects may be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for an example of a geographical region represented by a plurality of locations and information on vicinity;

FIG. 6 is a diagram for an example of a format of a Mode I CAQ (channel availability query) frame;

FIG. 7 is a diagram for a CVS (contact verification signal) information element format;

FIG. 8 is a diagram for an example of a Mode I CAQ frame format for an available channel list in at least one location;

FIG. 14 is a diagram for a Mode II CAQ frame;

FIG. 15 is a diagram for a channel query info field included in a CAQ frame defined by the present invention;

BEST MODE

Mode for Invention

Figure 1:
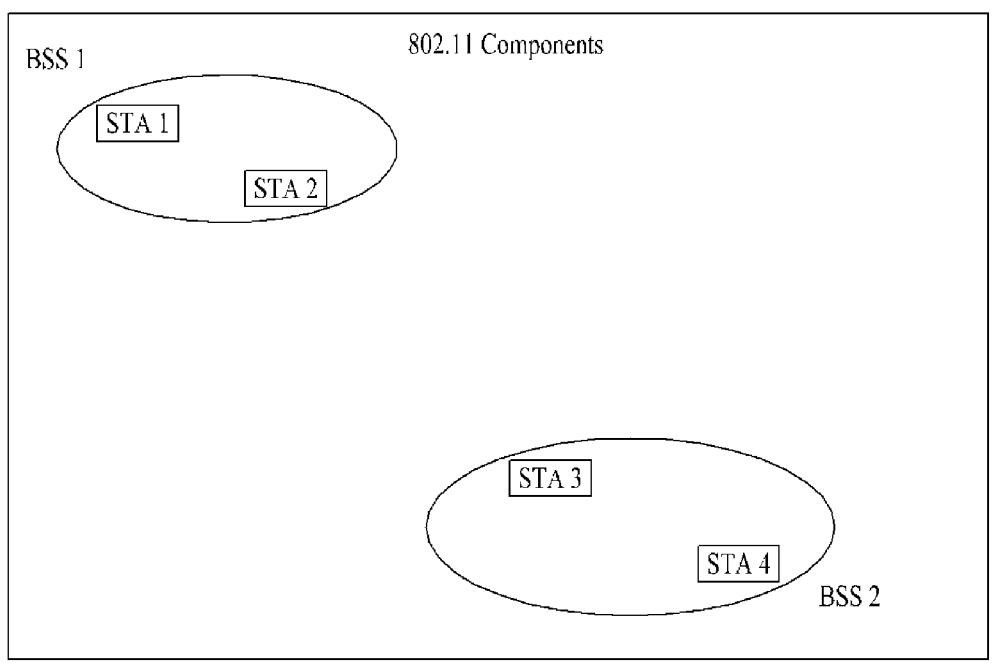
FIG. 1 is a diagram for an example of a structure of IEEE 802.11 system to which the present invention is applicable.

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention. In the following detailed description of the invention includes details to help the full understanding of the present invention. Yet, it is apparent to those skilled in the art that the present invention may be implemented without these details.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment.

Specific terminologies used in the following description are provided to help the understanding of the present invention and may be modified to a different form in a scope of not deviating from the technical idea of the present invention.

Occasionally, to prevent the present invention from getting vaguer, structures and/or devices known to the public are skipped or may be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of IEEE 802 system, a 3GPP system, 3GPP LTE/LTE-A (LTE-Advanced), and a 3GPP2 system, which correspond to wireless access systems. In particular, steps or parts among the embodiments of the present invention, which are not explained to clearly disclose the technical idea of the present invention, may be supported by the documents. And, all terminologies disclosed in the present specification may be explained by the standard document.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA may be implemented with such a radio technology as UTRA (universal terrestrial radio access), CDMA 2000 and the like. TDMA may be implemented with such a radio technology as GSM/ GPRS/EDGE (Global System for Mobile communications)/ General Packet Radio Service/Enhanced Data Rates for GSM Evolution). OFDMA may be implemented with such a radio technology as IEEE 802.11 (Wi-Fi), IEEE 802.16 (WiMAX), IEEE 802.20, E-UTRA (Evolved UTRA), etc. For clarity, the following description mainly concerns IEEE 802.11 system, by which the technical idea of the present invention may be non-limited.

FIG. 1 is a diagram for an example of a structure of IEEE 802.11 system to which the present invention is applicable.

IEEE 802.11 structure may consist of a plurality of configuration elements and a WLAN supporting mobility of an STA, which is transparent to an upper layer, may be provided by interaction of a plurality of the configuration elements. A basic service set (hereinafter abbreviated BSS) may correspond to a basic configuration block in IEEE 802.11 LAN. FIG. 1 depicts an example that there exist two BSSs (BSS 1 and BSS 2) and two STAs are included in each of the BSSs as members, respectively (STA 1 and STA 2 are included in the BSS 1 and STA 3 and STA 4 are included in the BSS 2). An oval indicating a BSS in FIG. 1 may be comprehended as a coverage area of the STAs included in the BSS to maintain a communication. This area may be called a basic service area (hereinafter abbreviated BSA). If an STA moves out of the BSA, the STA cannot directly communicate with different STAs within the BSA.

A BSS of a most basic type in IEEE 802.11 LAN may correspond to an independent BSS (hereinafter abbreviated IBSS). For instance, the IBSS may have a minimum form consisting of two STAs only. The BSS (BSS 1 or BSS 2), which is the simplest form and omitted different configuration elements, in FIG. 1 may correspond to a representative example of the IBSS. This sort of configuration is available when the STAs are able to directly communicate with each other. And, this kind of LAN may be configured when a LAN is necessary instead of being configured in advance. Hence, this network may be called an ad-hoc network.

When power of an STA is turned on or turned off or an STA enters into a BSS area or gets out of the BSS area, a membership of the STA in a BSS may be dynamically changed. In order to be a member of the BSS, the STA may join the BSS using a synchronization process. In order to access all services based on a BSS structure, the STA should be associated with the BSS. The association may be dynamically set and may include a use of a distribution system service (hereinafter abbreviated DSS).

Figure 2:
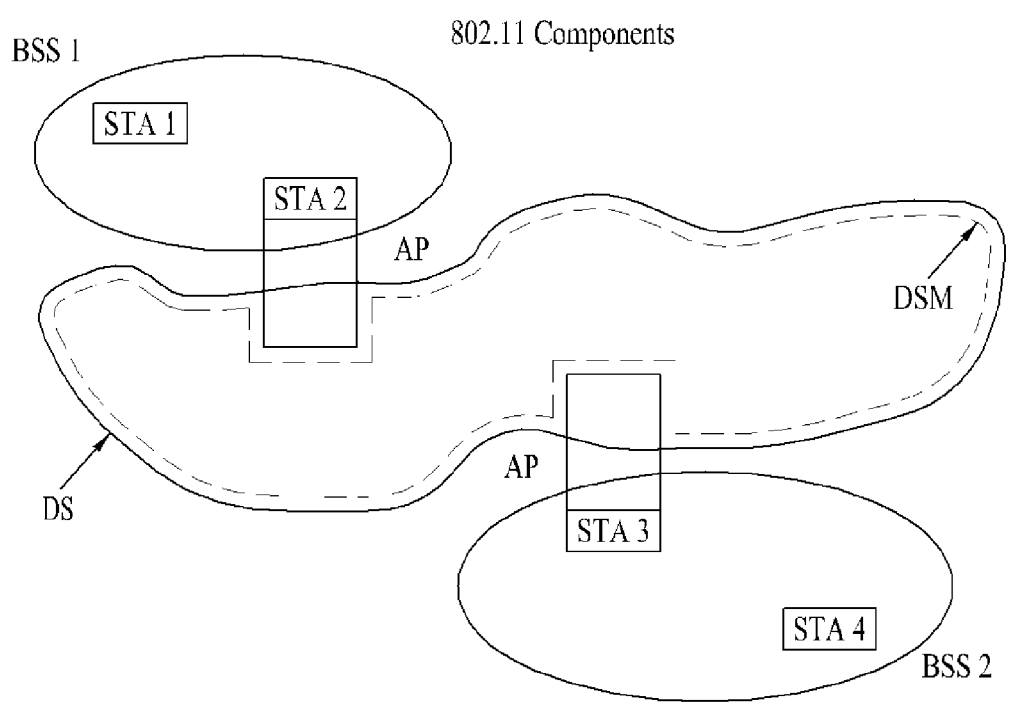
FIG. 2 is a diagram for a different example of a structure of IEEE 802.11 system to which the present invention is applicable.

FIG. 2 is a diagram for a different example of a structure of IEEE 802.11 system to which the present invention is applicable. FIG. 2 is a form to which such a configuration element as a distribution system (DS), a distribution system medium (DMS), an access point (AP), and the like is added to the structure of FIG. 1.

In a LAN, a direct distance between stations may be restricted by PHY performance. In some cases, the distance may be sufficient to perform a communication. Yet, in some cases, it may be necessary to perform a communication of a longer distance between stations. The distribution system (DS) may be configured to support an extended coverage.

The DS means a structure that BSSs are connected with each other. Specifically, instead of independently existing as depicted in FIG. 1, a BSS may exist as a configuration element of an extended form of a network consisting of a plurality of BSSs.

The DS is a logical concept and may be characterized by an attribute of the distribution system medium (DSM). Regarding this, IEEE 802.11 standard logically distinguishes a wireless medium (WM) from the distribution system medium (DSM). Each of the logical media is used for purposes different from each other and is used by configuration elements different from each other. According to the definition of IEEE 802.11 standard, the media may be limited to neither an identical medium nor media different from each other. Flexibility of the IEEE 802.11 LAN structure may be explained in that pluralities of the media are logically different from each other. In particular, IEEE 802.11 LAN structure may be variously implemented. The corresponding LAN structure may be independently characterized by a physical attribute of each implementation example.

The DS may support a mobile device in a manner of providing the mobile device with a seamless integration of a plurality of BSSs and logical services necessary for controlling an address to a destination.

The AP enables related STAs to access the DS via the WM and means an entity having STA functionality. Data may move between the BSS and the DS via the AP. For instance, an STA 2 and an STA 3 depicted in FIG. 2 have STA functionality and provide a function of enabling the related STAs (an STA 1 and an STA 4) to access the DS. And, since all APs basically correspond to an STA, all APs are entities capable of being addressed. An address used by the AP for a communication in the WM may not be identical to an address used by the AP for a communication in the DS.

A data transmitted to an STA address of an AP from one of STAs related to the AP is always received in an uncontrolled port and may be processed by IEEE 802.1X port entity. And, if a controlled port is authenticated, a transmission data (or a frame) may be delivered to the DS.

Figure 3:
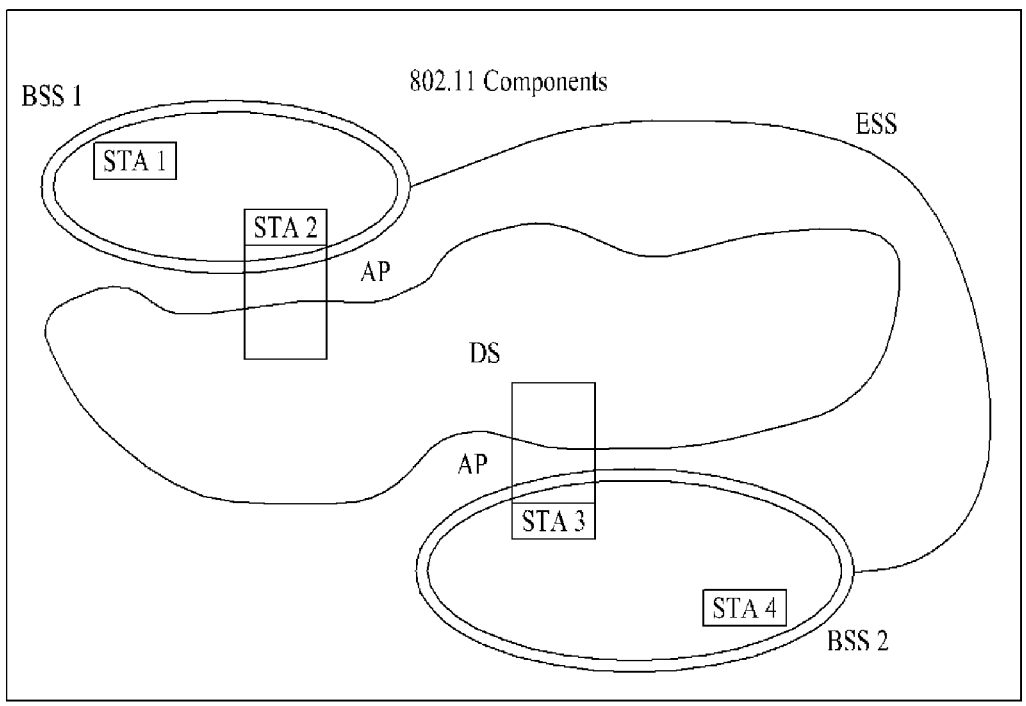
FIG. 3 is a diagram for a further different example of a structure of IEEE 802.11 system to which the present invention is applicable.

FIG. 3 is a diagram for a further different example of a structure of IEEE 802.11 system to which the present invention is applicable. FIG. 3 conceptually shows an extended service set (hereinafter abbreviated ESS) configured to provide a wider coverage in addition to the structure of FIG. 2.

A wireless network of an arbitrary size and complexity may consist of a DS and BSSs. This kind of network is called an ESS network in IEEE 802.11 system. The ESS may correspond to a set of BSSs connected with a single DS. Yet, the ESS does not include the DS. The ESS network is seen as an IBSS network in a LLC (logical link control) layer. STAs included in the ESS may communicate with each other and moving STAs may move from one BSS to another BSS (within an identical ESS) in a manner of being transparent to the LLC.

According to IEEE 802.11, nothing is assumed for a physical location of the BSSs depicted in FIG. 3. Forms described in the following are all available in IEEE 802.11. The BSSs may be partly overlapped with each other. This is a form generally used to provide a contiguous coverage. And, the BSSs may not be physically connected with each other and there is no limit for a logical distance between the BSSs. The BSSs may be physically positioned at an identical location. This may be used to provide a redundancy. And, one (or more) IBSS or ESS networks may physically exist in an identical space as one (or more) ESS network. This may correspond to a form of the ESS network in case that an ad-hoc network operates in the location at which the ESS network exists, physically duplicated IEEE 802.11 networks are configured by different organizations, two or more different access and security policies are required in an identical location, and the like.

Figure 4:
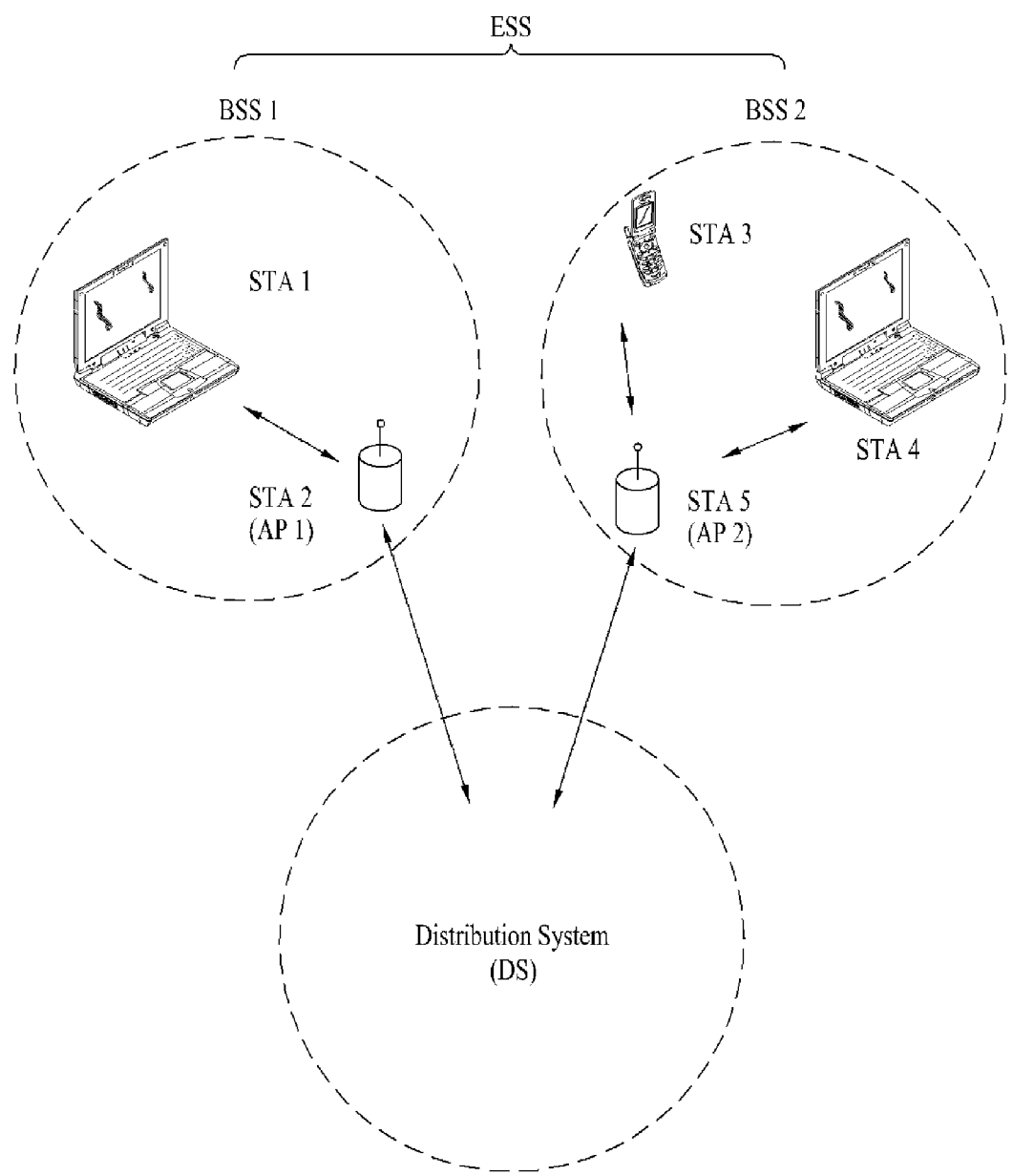
FIG. 4 is a diagram for an example of a structure of WLAN system.

FIG. 4 is a diagram for an example of a structure of WLAN system. FIG. 4 shows an example of an infrastructure BSS including a DS.

According to the example of FIG. 4, an ESS consists of a BSS 1 and a BSS 2. In a WLAN system, an STA corresponds to a device operating in accordance with a MAC/PHY regulation of IEEE 802.11. The STA includes an AP STA and a non-AP STA. The non-AP STA corresponds to a device directly controlled by a user such as a laptop computer and a cellular phone. In the example of FIG. 4, an STA 1, an STA 3, and an STA 4 correspond to the non-AP STA and an STA 2 and an STA 5 correspond to the AP STA.

In the following description, the non-AP STA may be called a terminal, a wireless transmit/receive unit (WTRU), a user equipment (UE), a mobile station (MS), a mobile terminal (MT), a mobile subscriber station (MSS), and the like. And, the AP is a concept corresponding to a base station (BS), a node B, an evolved Node B (eNB), a base transceiver system (BTS), a femto base station (femto BS), and the like in a different wireless communication field.

Available Channel List of an STA in a TV White Space

In order for an STA instead of an incumbent user to operate in a TV white space (TVWS), the STA should obtain a channel not interfering with the incumbent user in a specific location, i.e., an available channel list to protect the incumbent user and may operate according to the available channel list. Regarding an available channel list obtaining mechanism of the STA performed in the TVWS, examples of the present invention in obtaining an available channel for a plurality of locations and a contact verification operation performed after obtaining the available channel are explained in detail in the following description.

First of all, a process of obtaining an available channel may be differently defined according to a type of an STA. The type of the STA currently defined includes 2 types. One is a device of a low power and the device capable of being carried by a person (personal/portable STA (P/P STA)) and another one is a device of a high power and the device operating in a fixed position (fixed STA).

The fixed STA may transceives a signal in a specific position, which is fixed. In order to transmit a signal in the specific position, the fixed STA should obtain available channel information in a manner of accessing a GDB. In order to obtain the available channel information from the GDB, a location of the fixed STA should be determined To this end, such an equipment capable of checking a location as a GPS (global positioning system) may be installed in the fixed STA. Yet, the position of the fixed STA may be directly inputted by a person (professional installer). In case that the position of the fixed STA is directly inputted by the person, it is assumed that the position of the fixed STA does not change after the fixed STA is installed and the position of the fixed STA is inputted. If the position of the fixed STA changes (i.e., if the fixed STA is installed in a different position in a manner of being moved), a new position according to the change should be modified and registered. By doing so, location information of the fixed STA may be delivered to the GDB and the fixed STA may obtain available channel information in a corresponding position from the GDB.

The fixed STA may service a different fixed STA of the same kind or may service a P/P STA. When the fixed STA obtains available channel information from the GDB, the fixed STA should receive the available channel information of the fixed STA capable of being directly used by the fixed STA in a manner of delivering a device type of the fixed STA to the GDB. Simultaneously, in order for the fixed STA to perform a service for the P/P STA, available channel information capable of being used by the P/P STA should be additionally received from the GDB. Since a channel interval available to the fixed STA and the channel interval available to the P/P STA are different from each other and since maximum permissible transmit power and requirement for an adjacent channel for the fixed STA and the P/P STA are different from each other, an available channel list varies according to the type of each device. In particular, the fixed STA is permitted to transmit a signal on a frequency band of 512~608 MHz, 614~698 MHz, as well as 54~60 MHz, 76~88 MHz, 174~216 MHz, and 470~512 MHz. Yet, the P/P STA is not permitted to transmit a signal on a TVWS band of a different frequency band except the frequency band of 512~608 MHz and 614~698 MHz. And, the fixed STA may transmit a signal with a high power compared to the P/P STA. The maximum permissible transmit power of the fixed STA is 4 Watt (EIRP (Effective Isotropically Radiated Power)). On the other hand, the maximum permissible transmit power of the P/P STA is 100 mW (EIRP).

The P/P STA corresponds to the equipment capable of transceiving a signal in an unspecified position. A position of the P/P STA may change. In many cases, since the P/P STA corresponds to a portable device, it is difficult to predict the mobility of the P/P STA. The P/P STA may be divided into 2 types (Mode I STA and Mode II STA) according to whether the P/P STA has an identification capability for a position of the P/P STA. The identification capability for the position of the P/P STA means a geo-location determination capability and an access capability to the GDB via the internet access.

The Mode II STA has a capability of the geo-location determination and the internet access. After information on an available channel in a position of the Mode II STA is obtained by directly accessing the GDB, the Mode II STA may operate in the TVWS at the position of the Mode II STA. And, after the available channel information is obtained from the GDB, the Mode II STA may transmit a command signal enabling the Mode I STA to start a communication. Yet, the Mode I STA is not required to have a capability of checking a position of the Mode I STA or a capability of accessing the DB. Yet, the Mode I STA obtains available channel information in a manner of being controlled by a different STA (a Mode II STA capable of accessing the GDB and having valid available channel information or a fixed STA) and may perform an operation in the TVWS.

Mode II Channel Availability Query (CAQ)

The Mode II STA registers location information of the Mode II STA by accessing the GDB and should be able to obtain available TVWS channel list. A process of obtaining the available channel list obtained by the Mode II STA is called a Mode II channel availability query (Mode II CAQ) process.

After the Mode II STA has obtained the available channel information in a specific position via the CAQ process, if the position of the Mode II STA changes more than a prescribed distance (e.g., more than 100 meters) or previously obtained GDB information is not valid anymore, the Mode II STA performs the CAQ process again.

Basically, the Mode II CAQ is the process of obtaining available channel information in a specific position. Hence, if location information changes as the Mode II STA moves more than a prescribed distance (e.g., more than 100 meters), an overhead, which is resulted from obtaining an available channel in a new position by mandatorily accessing the GDB again, occurs. In order to reduce the overhead, it is able to apply a scheme of obtaining a channel available for the Mode II STA in multiple locations from the GDB in advance. This sort of scheme may be very usefully utilized in case that the Mode II STA may predict a moving path or a moving area of the Mode II STA.

Specifically, the Mode II STA may perform the Mode II CAQ for one or more locations. Location information on one location among the one or more locations may be configured by a combination of the information (information on a latitude, information on a longitude, information on an altitude) specifying the one location and vicinity information. For instance, the vicinity information may include radius information, which is based on the one location. As mentioned in the foregoing description, a combination of the location information on each of the one or more locations and the vicinity information may be determined and the location information on one or more locations may be configured by a set of the combinations.

FIG. 5 is a diagram for an example of a geographical region represented by a plurality of locations and information on vicinity.

Referring to an example of FIG. 5 (a), 3 different locations are determined on an anticipated moving path of the Mode II STA and a radius on each of the 3 locations is determined by a size of which the anticipated moving path is not straying from a union of the regions including each of the radiuses of the 3 locations. 3 points (P1, P2, and P3) are specified in the example of FIG. 5 (a) and the P1, the P2, and the P3 may be specified by a combination of latitude, longitude, and altitude (for instance, it may be represented as P1=(LAT1, LONG1, ALT1), P2=(LAT2, LONG2, ALT2), P3=(LAT3, LONG3, ALT3)). And, the vicinity information on the P1, the P2, and the P3 may be configured by each of the radius informations (R1, R2, and R3). Hence, the location information on the 3 locations may be configured by (P1, R1), (P2, R2), (P3, R3). The Mode II STA may perform the channel availability query to the GDB using the aforementioned location information.

Referring to an example of FIG. 5 (b), one location is determined on the anticipated moving path of the Mode II STA and 3 different radiuses capable of including the anticipated moving path may be determined from the one location. One location P1 on the anticipated moving path is specified in the example of FIG. 5 (b) and 3 different radiuses R1, R2, and R3 may be determined on the basis of the P1 as a center point. By doing so, the location information may be configured by (P1, R1), (P2, R2), (P3, R3). The Mode II STA may perform the channel availability query to the GDB using the aforementioned location information.

The GDB may calculate an available channel list for a region indicated by the location information (e.g., a combination of location and vicinity information) of which the Mode II STA has queried. If the Mode II STA queries on multiple locations (e.g., multiple combinations of location and vicinity information), the GDB calculates multiple available channel lists in a manner of combining the available channel lists corresponding to each of the locations and may be then able to respond to the query of the Mode II STA for the multiple available channel lists.

By performing the Mode II CAQ process, the Mode II STA may obtain multiple channel informations available on the anticipated moving path in advance.

Mode I CAQ

Since the Mode I STA has no database access capability or geo-location determination capability, the Mode I STA cannot independently operate in a TVWS. The Mode I STA may perform a communication in the TVWS at last only when the Mode I STA receives a special signal (e.g., an enabling signal) from a different STA (e.g., a Mode II STA). It is necessary for the Mode I STA to obtain available channel information from the Mode II STA before the Mode I STA transmits a data. As mentioned in the foregoing description, a process of obtaining the available channel information obtained by the Mode I STA via the Mode II STA is called a Mode I channel availability query (CAQ) process.

FIG. 6 is a diagram for an example of a format of a Mode I CAQ (channel availability query) frame.

A Category field may have a value indicating a category (spectrum management, QoS (quality of service), a block ACK, a public action, and the like) to which a frame format is applied. In an example of a CAQ frame format, the Category field may have a value of a code (e.g., 4) indicating the public action.

A Public Action field may have a value indicating operations related to an intra-BSS communication, an inter-BSS communication, an unassociated-STA communication with an AP. In the example of the CAQ frame format, the Public Action field may have a value indicating a channel availability query.

Subsequently, if a Reason Result Code field value corresponds to 1, it means that the Mode I CAQ is requested (in particular, a channel availability list is requested) and if the Reason Result Code field value corresponds to 3, it means that a result of the available channel list is successful. If the Reason Result Code field value corresponds to 1, following fields (i.e., Map ID, Channel number, Maximum power level, and validity) of a Length field may be omitted. If the Reason Result Code field value is 3, it corresponds to a response for a request of the available channel list and includes a result of the available channel list.

The Length field may have a value indicating a length of the remaining frame fields and a unit of the Length field is octet (i.e., 8-bit unit). The following fields of the Length field may be omitted. Since the Channel number field, the Maximum power level field, and the validity field may be repeated, the value of the Length field is variable.

The Channel number field, the Maximum power level field, and the validity field mean available channel number, permitted maximum output power, and available validity time, respectively. In case of transmitting an available channel list consisting of one or more numbers (N (N≥1)) of channels, the Channel number field, the Maximum power level field, and the validity field may be repeated as many as the number (N) of available channels and a corresponding channel list may have a Map ID which is a unique number. In this case, repeating a field N times means that the field exists N times. For instance, repeating a field once means that the field exists one time only. If even a single available channel exists, a Map ID is provided for the corresponding available channel. In particular, the Map ID is provided for one available channel list (one available channel list consists of N numbers of available channel(s)). And, if an available channel list is updated, the Map ID increases by 1. If a channel list is updated after a maximum value (e.g., $2^8-1$) of the Map ID is provided, the Map ID may correspond to 0 and a next updated channel list may be provided with the Map ID increasing by 1.

In addition, the Mode I STA should consistently check whether the Mode I STA exists in the coverage of the Mode II STA even after an available channel list is obtained via the Mode I CAQ and whether the available channel obtained via the Mode I CAQ is still valid. The aforementioned process is called contact verification and a signal transmitted to the Mode I STA by the Mode II STA for the contact verification is called a CVS (contact verification signal). In particular, the CVS is transmitted by an enabling STA (e.g., the Mode II STA) and the CVS is a signal transmitted to check whether dependent STAs (e.g., the Mode I STA) still exist in a reception range of the enabling STA and whether an available channel list is valid.

FIG. 7 is a diagram for a CVS (contact verification signal) information element (IE) format.

An Element ID field may have a value (e.g., 3) indicating that a corresponding IE is a CVS IE. A Length field is a field of one octet length and a value of the length field may be set to 1.

A Map ID of a CVS may indicate whether an available channel list is valid. A Mode I STA should consistently receive a CVS with a period less than a preset time interval (e.g., CVSTimeInterval). For instance, the CVSTimeInterval value may be set to 60 seconds. The Mode I STA should receive the CVS on every 60 seconds or with a period less than 60 seconds. The Mode I STA may judge that a corresponding channel list is continuously valid in a manner of consistently receiving the CVS, which corresponds to the Map ID of the currently possessed available channel list, with the set period. If the Mode I STA does not receive the CVS corresponding to the Map ID of the currently possessed available channel list for the CVSTimeInterval, the Mode I STA judges that the channel list corresponding to the Map ID is not valid anymore. In particular, the CVSTimeInterval may be represented as an expiration date of the available channel list. If the Mode I STA does not possess a valid available channel list, the Mode I STA should obtain an available channel list in a manner of performing the Mode I CAQ process again.

A case of not capable of receiving the CVS, which corresponds to the Map ID of the currently possessed available channel list, for the CVSTimeInterval by the Mode I STA may include a case of not capable of receiving the CVS itself (e.g., a case of getting out from the coverage of the Mode II STA by the Mode I STA) and a case that the Map ID of the CVS is not matched with the Map ID of the currently possessed available channel list although the CVS is received. In this case, the Mode I STA judges that the currently possessed available channel list is not valid anymore. The Mode I STA should obtain new available channel information corresponding to the Map ID included in the CVS in a manner of transmitting the Mode I CAQ again and receiving a Mode I CAQ response.

In case that the Mode II STA moves, the CVS and the Mode I CAQ may be used to inform the Mode I STA of an updated available channel list.

For instance, assume that the Map ID of the available channel list provided to the Mode I STA is k. Subsequently, if the Mode II STA moves more than a prescribed distance and if the location of the Mode II STA is modified, the Mode II STA may obtain an available channel list in a modified location again by accessing the GDB. If the channel list newly obtained from the GDB by the Mode II STA is different from the channel list of which the Mode II STA conventionally possessed, the Map ID of the newly obtained channel list may be set to k+1. By doing so, the Mode II STA may transmit the CVS to the Mode I STA in a manner of setting the Map ID value included in the CVS to k+1. Having received the CVS, the Mode I STA checks that k+1, which is the Map ID different from k of the Map ID of the available channel list possessed by the Mode I STA, is included in the CVS and may recognize that the available channel list is updated. Hence, the Mode I STA may transmit a Mode I CAQ request to the Mode II STA. The Mode II STA may transmit a Mode I CAQ response to the Mode I STA in response to the Mode I CAQ request. Values of a Map ID field, a Channel number field, a Maximum power level field, and a validity field included in the Mode I CAQ response are newly set to the value corresponding to a new available channel list.

Meanwhile, the Mode II STA may obtain a channel available for one or more locations from the GDB via the Mode II CAQ. By doing so, if the location of the Mode II STA were modified in the future, the Mode II STA does not access the GDB since the Mode II STA already obtained the channel list capable of being used in the modified location. Yet, a case that the Mode II STA does not access the GDB in the modified location may correspond to a case that channel validity of a corresponding channel list is not expired for travel time or a case that an update does not occur in the GDB for the travel time. If the channel validity is expired, the Mode II STA may access the GDB to obtain new available channel information in the modified location. If GDB update occurred, the GDB may inform the Mode II STA of the change of the available channel information (for instance, the DB may inform the Mode II STA in a form of an announcement).

As mentioned earlier, when the Mode II STA has obtained the channel list available for one or more locations in advance, if the information of the available channel among the available channel list obtained in advance is modified due to a location change or the GDB update, the modified available channel information should be reported to the Mode I STA. It is because the Mode I STA possesses the available channel list at the time of receiving a response for a Mode I CAQ request only. And, in terms of the Mode I STA, although whether the available channel list possessed by the Mode II STA is modified may be checked via whether the Map ID of the CVS is modified, since the CVS does not include the channel information, the Mode I STA should make a request for the modified channel list information to the Mode II STA again. Hence, having received the CVS of the modified Map ID, the Mode I STA may transmit the Mode I CAQ request to the Mode II STA.

Mode I CAQ for One or More Locations

The Mode II STA may inform the Mode I STA of a channel list capable of being used in one or more locations (in particular, multiple locations) at a time. A scheme for informing the Mode I STA of an available channel list by the Mode II STA includes a scheme of responding a CAQ in response to a CAQ request of the Mode I STA or a scheme of responding an unsolicited CAQ. The unsolicited CAQ response means a message of which the Mode II STA informs the Mode I STA of available channel information without the CAQ request of the Mode I STA.

FIG. 8 is a diagram for an example of a Mode I CAQ frame format used for delivering a channel list available in one or more locations. The Mode I CAQ frame format of FIG. 8 may be defined as a new frame format of which a Number of Locations field is added to the Mode I CAQ frame format of FIG. 6 and fields (the Map ID field, the Channel number field, the Maximum power level field, and the Validity field) corresponding to the channel list are repeated.

For clarity, explanation on the fields (Category, Public Action, and Reason Result Code) duplicated with FIG. 6 is omitted in the example of the Mode I CAQ frame format in FIG. 8.

Number of locations field may have a value indicating the number (i.e., K (K≥1)) of locations to which the Mode II STA queries the GDB. Since one available channel list is given to one location, the value (i.e., K) of the Number of locations field has a value identical to the number (the number of repeating of {one 'Map ID' and N number of 'Channel number, Maximum power level, and Validity' field}) of available channel lists in the field following the Number of locations field.

The Length field may have a value indicating the length of the fields following the Length field. In the Mode I CAQ frame format in FIG. 8, the Length field has a value of K*(N*3+1). Yet, the example shown in FIG. 8 is just an exemplary to explain the principle of the present invention. A form of a channel list repeating in a frame format, which is repeated to represent the channel list (or a channel map) for multiple locations, may be variously defined.

For instance, in case of K=1 in the example of FIG. 8, the Length field may be represented as the Length field includes information indicating the length (i.e., the length of the Map ID+the length of the Channel number field, the Maximum power level field, and the Validity field) of the channel list. For instance, if it is assumed that one channel list includes N number of channels, since the Channel number field, the Maximum power level field, and the Validity field are repeated N times (N*(1+1+1) and the length of the Map ID is 1, the Length field may have a value of N*3+1. In this case, a maximum value of the N is limited to the maximum value capable of being represented by the Map ID. In particular, in the example of FIG. 8, the Mode I CAQ frame format in case of K=1 has a configuration practically identical to the aforementioned configuration of the Mode I CAQ frame format in FIG. 6.

In a broad sense, in case of K>1 (i.e., K≥2), {one 'Map ID' and N number of 'Channel number field, Maximum power level, and Validity field'} may be repeated K times after the Length field. Since the length of the Map ID field, the Channel number field, the Maximum power level field, and the Validity field is one octet, respectively, the Length field may have a value of K*(N*3+1).

The Map ID field is a unique number of each channel list. And, a value different from each other is given to a channel list different from each other. In particular, since one available channel list is provided in one location, a Map ID of a channel list in one location and the Map ID of the channel list in another location are provided with a value different from each other. And, in case that an available channel list is updated, the Map ID may be provided with a value different from the value of the Map ID previously used. For instance, the Map ID may be set to increase by 1 on every update of the available channel list. Yet, this is just an exemplary and may be non-limited to this. According to the example that the Map ID increases by 1 on every update of the available channel list, in case that a channel list is updated after a maximum value (e.g., $2^8-1$) of the Map ID is given to the channel list, 1 is provided as a value of the Map ID for an updated channel list and the Map ID value increasing by 1 is provided for a channel list to be updated. In particular, the value of the Map ID field explained in FIG. 6, which is the example of the Mode I CAQ frame format for an available channel list in one location, is a scheme for providing 0 after a maximum value (e.g., $2^8-1$). On the other hand, the value of the Map ID field explained in FIG. 8, which is the example of the Mode I CAQ frame format for an available channel list in one or more locations, is a scheme for providing 1 after a maximum value (e.g., $2^8-1$) of the Map ID field. In the example of FIG. 8, the Map ID field having a value of 0 may be set to be used to indicate whether a channel list is updated and may not be used as an identification number of the channel list.

As shown in the example of FIG. 8, the Mode I CAQ for multiple locations may be used by a request of the Mode I STA or may be used by a decision of the Mode II STA, which knows a moving area of the Mode II STA and is capable of directly selecting an operation channel. In case of the former, the Mode I STA may transmit a Mode I CAQ request message to the Mode II STA before an operation is started and the Mode II STA may transmit a Mode I CAQ response message such as the example of FIG. 8 to the Mode I STA in response to the Mode I CAQ request message. In case of the latter, after obtaining an available channel list for multiple locations from the GDB on a random timing point, the Mode II STA may transmit (transmit in a form of an unsolicited CAQ response or an announcement) the Mode I CAQ response message to the Mode I STA. The latter case may be generally used more than the former case, by which the present invention may be non-limited.

After obtaining available channel list for multiple locations from the GDB and providing a Map ID different from each other to a channel list corresponding to each location, the Mode II STA may inform the Mode I STA of the corresponding channel lists at a time via the Mode I CAQ message such as the example of FIG. 8. The Map ID of which the Mode II STA informs the Mode I STA may be identical to the identification number given by the GDB according to an available channel list when the GDB transmits the available channel list to the Mode II STA. Or, besides the identification number given by the GDB, the Mode II STA may generate, provide, and manage a Map ID according to each available channel list. For instance, in case that the Mode II STA provides the Map ID to a plurality of available channel lists for multiple locations at a time, the Map ID may be sequentially numbered. This is because the Mode II STA intends to easily manage the Map ID in case the available channel list is updated by the GDB. And, if the available channel list is updated in a state that the Map ID is all assigned up to the maximum value (e.g., $2^8-1$), a value of the Map ID field is sequentially assigned not from 0 but from 1. In this case, in order to prevent the channel list assigned as Map ID=1 from being handled as a channel list identical to the channel list of previously assigned as Map ID=1, the Mode II STA transmits a CVS configured by Map ID=0 to the Mode I STA. Hence, although the Map ID of the Mode I CAQ transmitted thereafter has a value identical to the previous Map ID, the Mode II STA may inform that it is a different channel list identifier. And, Map ID=0 may be used as a usage for indicating that a correlation between the channel list and the map ID is newly defined instead of being assigned to the available channel list. In particular, in case of reusing a conventional Map ID value in a manner of assigning the Map ID from 1 again since the Map ID is over the maximum value, the Mode II STA may transmit the CVS configured by Map ID=0 to inform the Mode I STA of a channel list modification.

And, for instance, multiple locations included in a CAQ request frame may be sequentially mapped to a plurality of available channel lists (WSM) included in a CAQ response frame. In particular, if the multiple locations included in the CAQ request are sequentially called a first location, a second location, . . . , a K location, the CAQ response may sequentially include an available channel list for the first location, an available channel list for the second location, . . . , an available channel list for the K location. Similar to this, an order of the Map ID included in a CVS frame may be mapped to the order (or the order of a plurality of available channel lists in the CAQ response frame) of the location information in the CAQ request frame as well.

Figure 9:
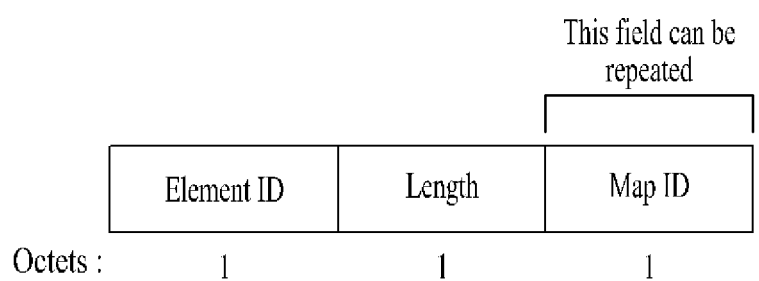
FIG. 9 is a diagram for a CVS information element format for at least one available channel list.

FIG. 9 is a diagram of a CVS information element (IE) format for one or more available channel lists. A CVS format in FIG. 9 is different from the CVS format in FIG. 7 in that the Map ID field may be repeated. Since the rest of the fields are identical to the fields of the example of FIG. 7, duplicated explanation is omitted. In the CVS format in FIG. 9, it is not excluded a case that one Map ID field is included only.

The Mode II STA may provide the Map ID of one or more channel lists to the Mode I STA using the CVS format in FIG. 9. The Mode I STA may judge that a corresponding channel list is continuously valid in a manner of consistently receiving a CVS, which corresponds to the Map ID of a currently possessed available channel list, with a period less than a predetermined time interval (e.g., CVSTimeInterval). And, in case that although the Mode I STA receives the CVS itself for the CVSTimeInterval but cannot receive a Map ID of a specific channel list in the received CVS for the CVSTimeInterval (e.g., 60 seconds), the Mode I STA may judge that the corresponding channel list is not valid anymore. If the Mode I STA cannot receive the CVS itself for the CVSTimeInterval, the information on the channel lists obtained via the Mode I CAQ becomes invalid. In this case, the Mode I STA may perform the Mode I CAQ process again.

In particular, the CVSTimeInterval may be represented as an expiration date of the available channel list. Hence, in order to maintain one or more channel lists valid for the time more than the CVSTimeInterval, one or more Map IDs for one or more channel lists should be delivered to the Mode I STA in a manner of being included in the CVS. To this end, the CVS of the format depicted in FIG. 9 may be used.

Having received the CVS, the Mode I STA checks the Map IDs included in the corresponding CVS. And then, the Mode I STA judges the channel list(s) corresponding to the Map ID, which does not correspond to the Map ID included in the CVS among the channel lists of which the Mode I STA possessed in advance (i.e., the Mode I STA possesses a plurality of channel lists and a plurality of Map IDs corresponding to a plurality of the channel lists via a latest Mode I CAQ), as invalid. The Mode I STA may discard the channel list(s) or simply may not use the channel list(s).

The Mode II STA may deliver the information on a plurality of the available channel lists to the Mode I STA in advance via the Mode I CAQ response (a response for the Mode I CAQ request of the Mode I STA or an unsolicited response). The Mode II STA may inform the Mode I STA of whether the preliminarily delivered a plurality of the available channel lists are continuously valid using the CVS. In particular, it is able to represent that the Mode II STA renewals the expiration date of the channel list capable of being used by the Mode I STA on every CVSTimeInterval using the CVS.

In this case, each of the map IDs preliminarily provided in the process of the Mode I CAQ does not need to be mandatorily included in the CVS. In particular, although the Mode II STA should consistently transmit the CVS on every CVSTimeInterval (e.g., 60 seconds), a Map ID of an available channel in one location only may be included in the CVS. The Mode I STA may identify the available channel list applied in a current location (and current timing point) corresponding to one of a plurality of the available channel lists previously obtained via the Mode I CAQ.

And, the Map ID included in the CVS not always corresponds to the channel list currently capable of being used by the Mode I STA. Besides the channel list currently capable of being used by the Mode I STA, the Map ID for a different channel list except the currently available channel list among the channel lists previously transmitted to the Mode I STA (using the Mode I CAQ) may be consistently provided to the Mode I STA via the CVS as well. For instance, as shown in FIG. 5 (b), if an available channel in (P1, R2) is a subset of an available channel in (P1, R1), the operation as mentioned in the above may be performed. For instance, assume a case that a MAP ID of an available channel in (P1, R1) region is 1, 2, and 3, the MAP ID of the available channel in (P1, R2) is 1 and 2, and the MAP ID of the available channel in (P1, R3) is 1. In this case, if the Mode I STA is currently positioned at the (P1, R1) region, the CVS received by the Mode I STA includes the MAP ID=1, 2, and 3. The MAP ID 1 and 2 correspond to the available channel list in the (P1, R2) region as well. Similarly, among the MAP ID=1, 2, and 3, which are included in the CVS received by the Mode I STA positioned at the (P1, R1) region, the MAP ID=1 corresponds to the available channel list (i.e., a different channel list) in the (P1, R3) region as well.

As mentioned in the foregoing description, the CVS may include a currently available channel list and a plurality of Map ID fields corresponding to the different channel lists. In particular, including a Map ID in the CVS may be called a renewal of a channel list corresponding to the corresponding Map ID. By performing a renewal of the corresponding channel list using the CVS from a transmission timing of the channel list on every CVSTimeInterval, it is able to manage the corresponding channel list to be consistently valid. Or, among a plurality of the Map IDs corresponding to a plurality of the channel lists preliminarily provided to the Mode I STA, a Map ID not included in a previous CVS may be included in a later CVS. For instance, in case that the Mode I STA does not discard a channel list corresponding to the Map ID not included in the CVS and does not simply use the channel list, the Mode I STA may perform a renewal for the channel list, which is not used before receiving a latest CVS although the Mode I STA possesses the channel list. In this case, the Mode I STA may simply operate in a manner that the Mode I STA uses a channel list(s) corresponding to the Map ID(s) included in the latest CVS and does not use the channel list(s) corresponding to the Map ID(s) not included in the latest CVS.

Meanwhile, if a channel list is modified due to a movement of the Mode II STA, the Mode II STA may inform the Mode I STA of a modified available channel list (e.g., in a manner of an announcement) using the Mode I CAQ. Yet, if the modified available channel list is a subset of the available channel list prior to the modification and there exists a channel list coincident with the modified available channel list among the channel lists corresponding to the Map ID included in the CVS, the Mode II STA does not inform the Mode I STA of the modified available channel list via the Mode I CAQ but informs the Mode I STA of which channel is not valid anymore via the CVS. In this case, the Map ID of the channel list including the channel, which is not valid anymore, is not included in the CVS. Having received the aforementioned CVS, the Mode I STA judges that the channel list corresponding to the Map ID, which is not included in the CVS, is not valid anymore. And then, the Mode I STA does not use (or may discard the channel list) the channel list. In particular, in terms of the Mode I STA, the channel list capable of being used by the Mode I STA is a union of the channel list corresponding to the Map ID included in the lately received CVS.

For instance, the Mode I STA may obtain available channel information on multiple locations in advance using the Mode I CAQ message such as the example of FIG. 8. If a location of the Mode I STA is modified, the Mode I STA may continuously check (i.e., tracking) whether a plurality of available channel lists for the multiple locations are valid in a manner of not using a new Mode I CAQ message in a modified location but receiving the CVS (e.g., the CVS of FIG. 9) only. If the channel list capable of being used by the Mode I STA is changed since the location of the Mode I STA and/or the Mode II STA is modified, the Mode II STA may transmit a Map ID of the modified channel list to the Mode I STA via the CVS (in this case, assume that the channel list corresponding to the corresponding Map ID is provided to the Mode I STA in advance using the Mode I CAQ).

Having received the CVS, the Mode I STA may check whether there exists a channel list corresponding to the Map ID received via the CVS among the available channel list in the multiple locations obtained in advance via the Mode I CAQ. If the Mode I STA possesses the available channel list corresponding to the Map ID included in the CVS, the Mode I STA may use the channel list currently used in a manner of replacing into a channel list corresponding to the Map ID included in the CVS. If the Mode I STA does not possess the available channel list corresponding to the Map ID included in the CVS or the Map ID of the CVS is set to 0, the Mode I STA may receive a new available channel list from the Mode II STA. The Mode I STA may obtain a new available channel list by receiving a Mode I CAQ response from the Mode II STA with/without a request. This Mode I CAQ process may be called an updated Map ID obtaining process or a Map ID reset process.

In case of the Mode I CAQ used as a usage of updating a Map ID, if the Mode II STA receives a Mode I CAQ request message, the Mode II STA transmits an updated Map ID and available channel list information corresponding to the updated Map ID to the Mode I STA via a Mode I CAQ response message. Having received the Mode I CAQ response message, the Mode I STA may add the updated Map ID and the available channel list corresponding to the updated Map ID to the conventional valid available channel lists.

Meanwhile, after receiving the CVS where the Map ID=0, the Map ID of the channel list newly received via the Mode I CAQ response may have a number identical to the Map ID of the conventional channel list. In this case, the conventional channel list may be replaced (or reset) in a manner of matching the newly obtained channel list with the corresponding Map ID.

In the foregoing description, the Mode I STA obtains an available channel list in one or more locations and corresponding Map ID in advance using the latest Mode I CAQ process and a method for the Mode II STA of informing the Mode I STA of validity of the obtained available channel list via the CVS is described.

Subsequently, a case of newly configuring the available channel list itself, which is obtained using the Mode I CAQ process, is explained. For instance, it is able to assume a case that the Mode II STA moves the available channel list to not a location of which the Mode II STA obtained the available channel list in advance but a new location or a case that the Mode II receives a notification from the GDB notifying that the available channel list is updated. In this case, although the Mode II STA transmits CVS to the Mode I STA, since the Mode II STA cannot be sure the validity of the available channel list corresponding to the Map ID included in the CVS, it is necessary for the Mode II STA to have a process of obtaining the available channel list again. Hence, the Mode II STA may obtain a new available channel list (an available channel list in a modified location or an available channel list updated in the GDB although there is no location change) by accessing the GDB again.

If the available channel list newly obtained by the Mode II STA from the GDB is not matched with the conventional available channel list, the Mode II STA may transmit the CVS including the updated Map ID to the Mode I STA. Since the Mode I STA does not have a channel list of the Map ID included in the CVS, the Mode I STA transmits a Mode I CAQ request message to the Mode II STA and may receive a Mode I CAQ response message including the information on the updated available channel list from the Mode II STA.

Or, if the available channel list newly obtained by the Mode II STA from the GDB is matched with the conventional available channel list, the Mode II STA may transmit the CVS using the conventional Map ID as it is. Having received the CVS, the Mode I STA does not perform a Mode I CAQ request.

In the following description, a Mode I CAQ process for one or more locations according to the aforementioned example of the present invention and various examples to which a CVS transmission and reception process is applied are explained.

Figure 10:
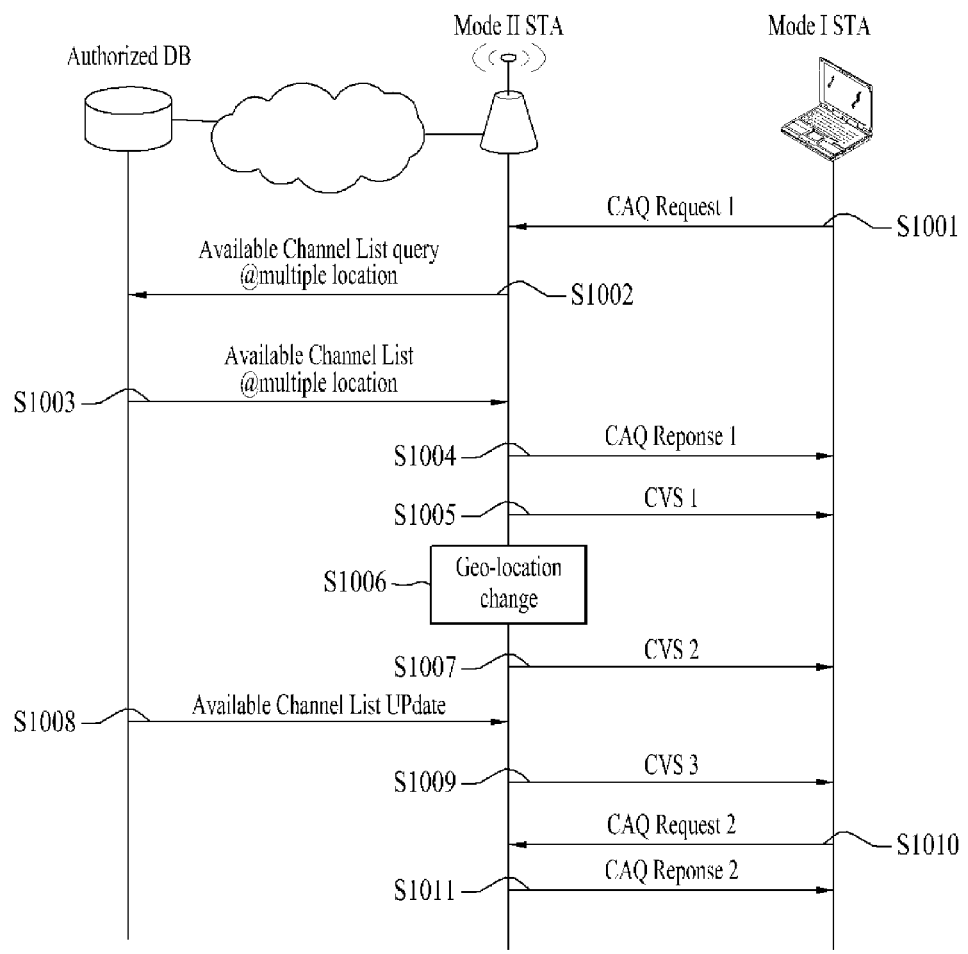
FIG. 10 is a flowchart for a Mode I CAQ process and a CVS transmission/reception process according to one embodiment of the present invention.

FIG. 10 is a flowchart for a Mode I CAQ process and a CVS transmission/reception process according to one embodiment of the present invention. In the example of FIG. 10, assume that the Mode I STA is positioned within the coverage of the Mode II STA and the Mode II STA is capable of exchanging information with an authorized DB via the internet and the like.

In the step S1001, the Mode I STA may transmit a CAQ Request 1 to the Mode II STA and this corresponds to a Mode I CAQ request.

In the step S1002, the Mode II STA may transmit an available channel list query for multiple locations to the authorized DB (e.g., DB). This corresponds to a Mode II CAQ request. For instance, the Mode II STA is positioned at a P1 in the example of FIG. 5 (a) and may query a channel list available in 2 locations (i.e., (P1, R1) and (P2, R2)) to the GDB.

In the step S1003, the GDB may deliver an available channel list for multiple locations to the Mode II STA in response to the query of the Mode II STA. This corresponds to a Mode II CAQ response. For instance, the available channel list provided by the GDB to the Mode II STA assumes a case that the channel number of the channels capable of being used in (P1, R1) is {1, 2, and 3} and the channel number of the channels capable of being used in (P2, R2) is {3, 4, and 5}.

In the step S1004, the Mode II STA may transmit a channel list capable of being used by the Mode I STA among the available channel list for the multiple locations obtained from the GDB to the Mode I STA. This corresponds to a Mode I CAQ response. For instance, the information included in the CAQ Response 1 may be summarized in Table 1 as follows.

TABLE 1

| CAQ response 1 | | |
|---|---|---|
| Location | Map ID | Channel number |
| (P1, R1) | 1 | {1, 2, 3} |
| (P2, R2) | 2 | {3, 4, 5} |

Meanwhile, although the step S1002 may be initiated by the step S1001, the Mode II STA may transmit the available channel list query to the DB despite that the step S1001 is not performed. And, if the Mode II STA already obtained the available channel list for the multiple locations from the GDB, the Mode II STA may perform the Mode I CAQ response of the S1004 in response to the Mode I CAQ request without performing the Mode II CAQ process of the S1002 and the S1003. Or, the Mode II STA may deliver the available channel list for the multiple locations to the Mode I STA without performing the S1001 (or, without performing the S1001, the S1002, and the S1003). This corresponds to an unsolicited Mode I CAQ response. As mentioned in the foregoing description, the available channel list for the multiple locations may be transmitted to the Mode I STA in the step S1004 in various situations.

In the step S1005, the Mode II STA may transmit a CVS (CVS1) to the Mode I STA. The CVS1 may include information where Map ID=1 only. Hence, the Mode I STA may determine a channel capable of being used by the Mode I STA where the channel number {1, 2, 3} corresponding to the map ID=1 is available in a current location and current timing point (e.g., for CVSTimeInterval). By doing so, the Mode I STA may perform a TVWS communication.

In the step S1006, a geo-location change may occur due to a movement of the Mode II STA to a different location. For instance, assume that the Mode II STA stays in the (P1, R1) position before the step S1006 and moves to a (P2, R2) position in the step S1006 (more specifically, assume that the Mode II STA moves to the (P2, R2) position except a part overlapped with the (P1, R1) region). According to the location change, the available channel list may be modified. Since the Mode II STA has already obtained the available channel list in the (P2, R2) position in the step S1003, the Mode II STA does not need to query a new available channel list to the GDB due to the location change of the step S1006.

In the step S1007, the Mode II STA may transmit a CVS (CVS2) including a Map ID of an available channel list in a current location to the Mode I STA. The CVS2 may include information where Map ID=2 only. Hence, the Mode I STA may determine a channel capable of being used by the Mode I STA where the channel number {3, 4, 5} corresponding to the map ID=2 is available in a current location and current timing point (e.g., for CVSTimeInterval). By doing so, the Mode I STA may perform a TVWS communication.

While the Mode II STA is staying in the (P2, R2) region, update of the channel list, which is available in the (P2, R2) position, may occur. In the step S1008, the GDB may transmit an updated available channel list to the Mode II STA. This corresponds to an unsolicited Mode II CAQ response. For instance, the updated available channel list received by the Mode II STA in the step S1008 (e.g., channel number {3, 4, and 6} in the position (P2, R2)) may be not matched with the available channel list (e.g., channel number {3, 4, and 5} in the position (P2, R2)) previously obtained in the step S1003. In this case, the Mode II STA may assign a Map ID to the updated available channel list as shown in the following Table 2.

TABLE 2

| Location | Map ID | Channel number |
|---|---|---|
| (P2, R2) | 3 | {3, 4, 6} |

In the step S1009, the Mode II STA may transmit a CVS (CVS3) to the Mode I STA to inform that the available channel list is updated in the (P2, R2). The CVS3 may include information where Map ID=3 only. In this case, the Mode I STA includes the available channel list where Map ID=1, which is included in the CAQ Response received in the step S1004, and the available channel list where the Map ID=2 only. Hence, when the Mode I STA checks the Map ID included in the received CVS3, since the Mode I STA does not have Map ID=3, the Mode I STA cannot determine an available channel list corresponding to the Map ID=3. Hence, the Mode I STA should obtain new available channel information.

In the step S1010, the Mode I STA may transmit a CAQ Request 2 to the Mode II STA. This corresponds to the Mode I CAQ request.

In the step S1011, the Mode II STA may transmit the CAQ response 2 to the Mode I STA. This corresponds to the Mode I CAQ response. In this case, information of a following Table 3 should be included in the CAQ response 2.

TABLE 3

| CAQ Response 2 | | |
|---|---|---|
| Location | Map ID | Channel number |
| (P2, R2) | 3 | {3, 4, 6} |

Meanwhile, explanation on the aforementioned FIG. 10 may be identically applied to the example of FIG. 5 (b). For instance, S1001 to S1005 and S1007 to S1011 may be identically applied to the example. It may be understood that the channel list is modified due to the movement of the Mode II STA from the (P1, R1) position to the (P1, R2) in the step S1006 (in particular, the channel list is modified when the Mode II STA moves from the (P1, R2) region to the region except the (P1, R1) region).

Figure 11:
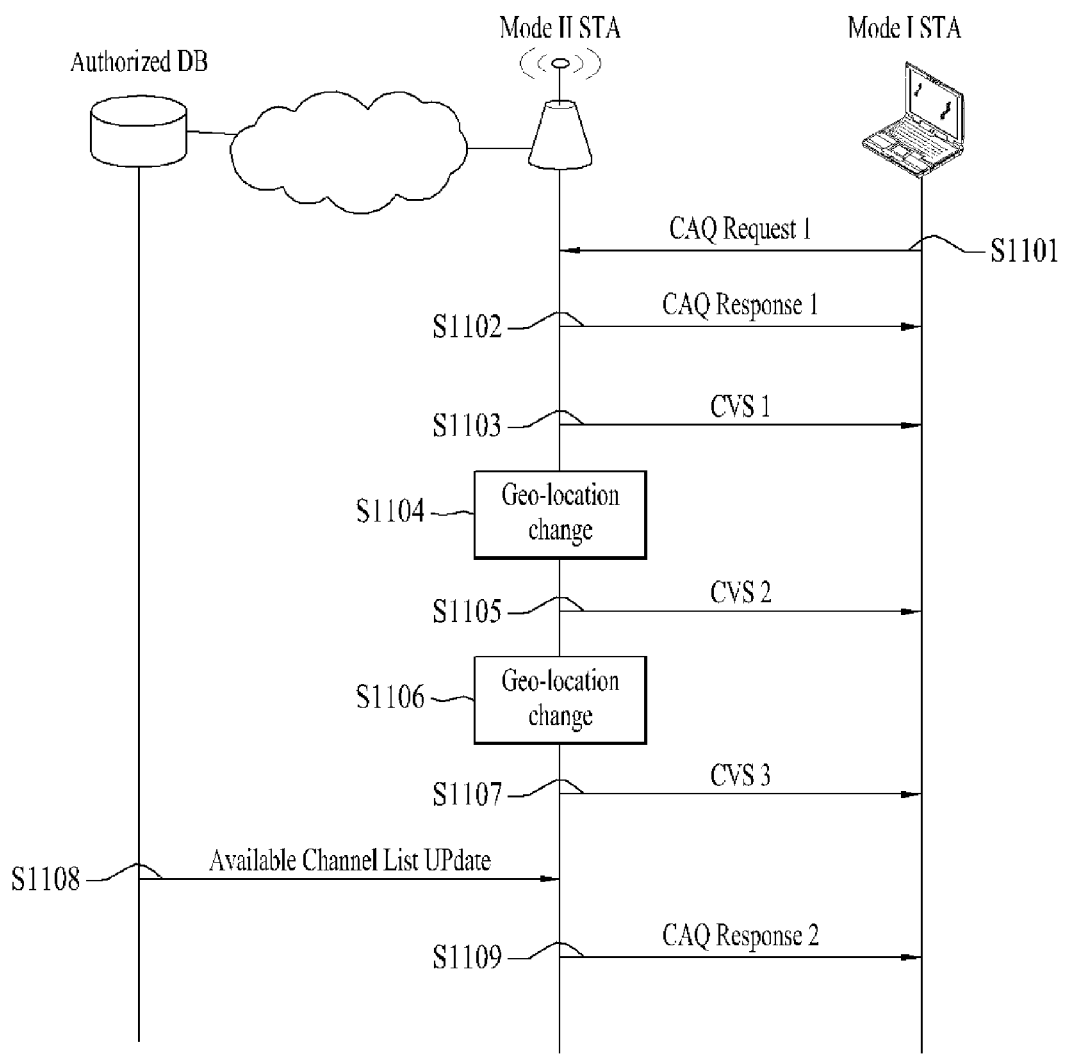
FIG. 11 is a flowchart for a Mode I CAQ process and a CVS transmission/reception process according to a different embodiment of the present invention.

FIG. 11 is a flowchart indicating a Mode I CAQ process and a CVS transceiving process according to a different example of the present invention. In the example of FIG. 11, for a part of which a separate explanation does not exist, the explanation for the example of FIG. 10 may be applied as it is.

In the example of FIG. 11, assume a case that the Mode II STA starts from P1 of the example of FIG. 5 (b) and moves in a manner of passing through (P1, R1) region, (P1, R2) region, and (P1, R3) region. In particular, an anticipated moving path of the Mode II STA is shown in FIG. 5 (b) and assume that the Mode II STA has already obtained a channel list available in the anticipated moving path (for instance, assume that the Mode II STA already obtained available channel lists from the GDB).

In the step S1101, the Mode I STA may transmit a Mode 1 CAQ Request 1 (CAQ Request 1) to the Mode II STA. In the step S1102, the Mode II STA may transmit a Mode I CAQ response (CAQ Response 1) to the Mode I STA. For instance, a channel list available in each location including the anticipated moving path of the Mode II STA may be included in the CAQ Response 1 as shown in the following Table 4.

TABLE 4

| CAQ response 1 | | |
|---|---|---|
| Location | Map ID | Channel number |
| (P1, R1) | 1 | {1, 2, 3} |
| (P1, R2) | 2 | {1, 2} |
| (P1, R3) | 3 | {1} |

As shown in the Table 4, in case of the multiple locations are configured as depicted in FIG. 5 (b), an available channel in a wider region may be set to a subset of an available channel of a narrower region. For instance, when a channel available in wherever in the wider region is determined, since the region is wider, possibility of existence of an incumbent user or interference of a neighboring channel may increase. Yet, this is just an exemplary for the understanding of the present invention. The present embodiment may be applied to various cases where an available channel list in one location becomes a subset of an available channel list in a different location.

The step S1102 may be performed in response to the step S1101 or may be performed by an unsolicited form.

In the step S1103, the Mode II STA may transmit a CVS (CVS1) to the Mode I STA. The CVS1 may include Map ID=1, 2, and 3. Hence, the Mode I STA may determine a channel capable of being used by the Mode I STA where the channel number {1, 2, 3} corresponding to the Map ID=1, 2, and 3 is available in a current location and current timing point (e.g., for CVSTimeInterval). By doing so, the Mode I STA may perform a WS communication.

In the step S1104, a geo-location change occurs due to the movement of the Mode II STA moving to a (P1, R2) position (in particular, in case that the Mode II STA, which exists in the (P1, R1) region, moves to the (P1, R2) region in a manner of getting out an R1 radius) and an available channel list may be modified according to the movement of the Mode II STA. In the step S1105, the Mode II STA may transmit a CVS (CVS2) to inform the Mode I STA of the change of the available channel list. The CVS2 may include the Map ID=2 and 3. Hence, the Mode I STA may determine a channel capable of being used by the Mode I STA where the channel number {1, 2} corresponding to the Map ID=2 and 3 is available in a current location and current timing point (e.g., for CVS-TimeInterval). By doing so, the Mode I STA may perform a TVWS communication. And, the Mode I STA simply does not use or may discard the channel number {3} not corresponding to the Map ID of the CVS.

In the step S1106, a geo-location change occurs due to the movement of the Mode II STA moving to a (P1, R3) position (in particular, in case that the Mode II STA, which exists in the (P1, R2) region, moves to the (P1, R3) region in a manner of getting out an R2 radius) and an available channel list may be modified according to the movement of the Mode II STA. In the step S1107, the Mode II STA may transmit a CVS (CVS3) to inform the Mode I STA of the change of the available channel list. The CVS3 may include the Map ID=3. Hence, the Mode I STA may determine a channel capable of being used by the Mode I STA where the channel number {1} corresponding to the Map ID=3 is available in a current location and current timing point (e.g., for CVSTimeInterval). By doing so, the Mode I STA may perform a TVWS communication. And, the Mode I STA simply does not use or may discard the channel number {2, 3} not corresponding to the Map ID of the CVS.

Meanwhile, While the Mode II STA is staying in the (P1, R3) region, update of the channel list, which is available in the (P1, R3) position, may occur. In the step S1108, the GDB may transmit an updated available channel list to the Mode II STA. This corresponds to an unsolicited Mode II CAQ response. For instance, the updated available channel list received by the Mode II STA in the step S1108 (e.g., channel number {4, 5} in the position (P1, R3)) may be not matched with the available channel list (e.g., channel number {1} in the position (P1, R3)) previously obtained. In this case, the Mode II STA may assign a Map ID to the updated available channel list as shown in the following Table 5.

TABLE 5

| Location | Map ID | Channel number |
| --- | --- | --- |
| (P1, R3) | 4 | {4, 5} |

In the step S1109, the Mode II STA may transmit an unsolicited Mode I CAQ response (CAQ Response 2) to the Mode I STA to inform that the available channel list is updated. In this case, information of a following Table 6 should be included in the CAQ Response 2.

TABLE 6

| CAQ Response 2 | | |
| --- | --- | --- |
| Location | Map ID | Channel number |
| (P3, R3) | 4 | {4, 5} |

Figure 12:
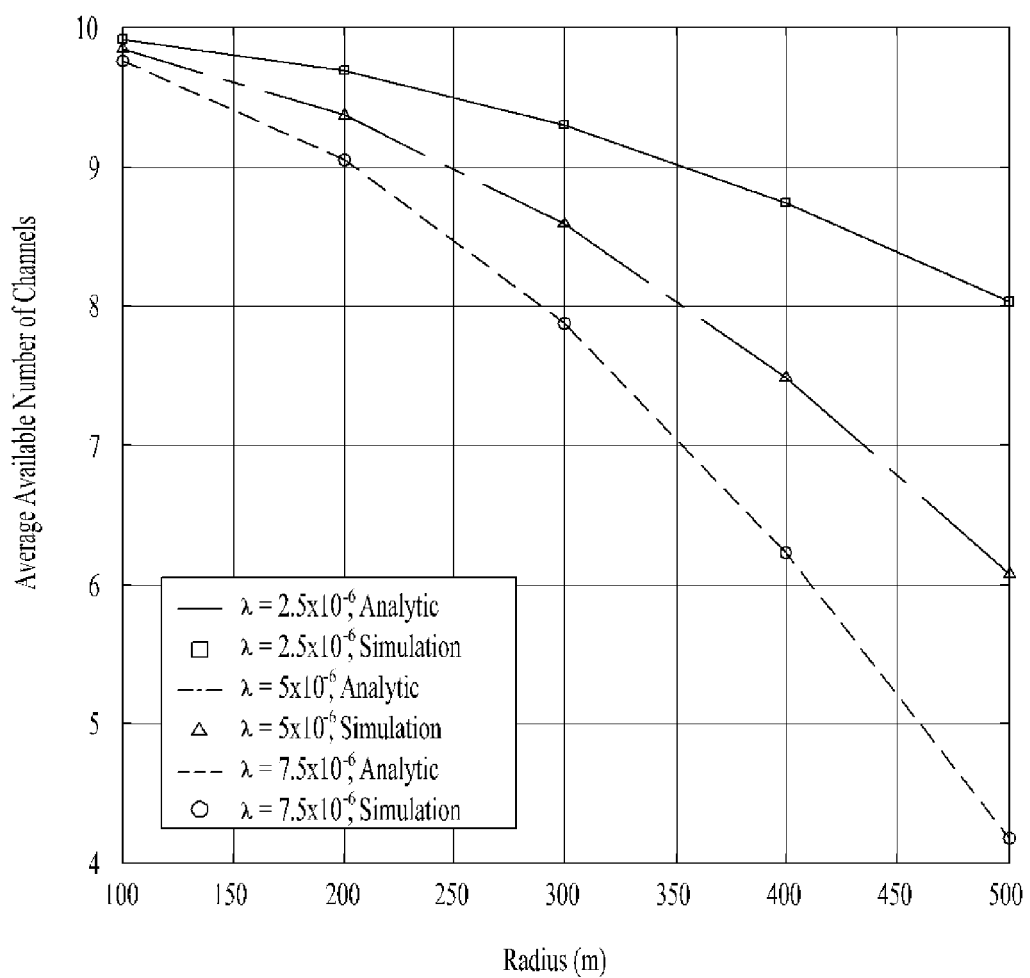
FIG. 12 is a diagram for a result of simulating the number of available channels according to configured radius.

Meanwhile, explanation on the aforementioned FIG. 12 may be identically applied to the example of FIG. 5 (a). For instance, it may be understood that the channel list is modified due to the movement of the Mode II STA from the (P1, R1) position to the (P2, R2) in the step S1104 (in particular, the channel list is modified when the Mode II STA moves from the (P2, R2) region to the region except the (P1, R1)region).

In this case, the available channel information in (P2, R2) may correspond to a subset of the available channel information in (P1, R1). As mentioned earlier, a CVS scheme for informing the validity of the available channel in the R2 radius except the R1 radius may be used.

Method of Setting a Range of Multiple Operations in TVWS

Embodiments of the present invention described in the following description may be applied separate from the aforementioned various embodiments of the present invention or may be simultaneously applied by a combination thereof.

As mentioned in the foregoing description, the Mode II STA may obtain available channel information in a plurality of locations (or a plurality of ranges including radiuses of each of a plurality of the locations hereinafter abbreviated a 'range of multiple operations') by directly accessing the GDB. For instance, the Mode II STA checks a current location of the Mode II STA, configures a plurality of operation ranges including an anticipated moving path from a current location, and may be then able to obtain channel information available in a plurality of the operation ranges from the GDB. And, since the Mode II STA may get out of a plurality of the operation ranges, the Mode II STA checks the location of the Mode II STA with a prescribed time period (e.g., on every 60 seconds). If the Mode II STA gets out of the operation range, the Mode II STA may obtain available channel information in a manner of accessing the GDB again. As mentioned in the foregoing description, if the Mode II STA does not get out of a plurality of the operation ranges, the Mode II STA does not need to check available channel information from the GDB for a long time (e.g., 24 hours (in general, a TV band usage schedule for 24 hours is determined)), an overhead caused by obtaining the available channel information and delay may be reduced. A method for the Mode I STA to obtain and use an available channel in a plurality of the operation ranges via a CAQ, a CVS, and the like with the Mode II STA is omitted since it is duplicated with the aforementioned explanation.

In applying the method for the Mode II STA (or the Mode I STA) to use available channel information for each of a plurality of the operation ranges, examples of the present invention setting an operation range are explained in the following description.

For instance, when the Mode II (or the Mode I) STA has mobility in a plurality of the operation ranges, if an operation range is set bigger (or wider), the probability that the Mode II (or the Mode I) STA will get out of the set operation range is reduced. In this case, time delay required for checking/obtaining an available channel between the GDB and the Mode II STA is reduced and a signaling overhead is also reduced. This may be identically performed between the Mode II STA and the Mode I STA as well. For instance, compared to a case that a single operation range of a radius of 500 m is set, if a plurality of operation ranges of a radius of 100 m are set, signaling delay and an overhead may significantly increases.

Yet, setting an operation range bigger is not always beneficial. For instance, as the operation range is set bigger, the number of incumbent users (or licensed bands), which should be considered in the operation range, may increase. Hence, as the operation range is set bigger, the number of channels capable of being used by an unlicensed device may be reduced. For instance, if licensed devices are positioned with a distribution of 2 dimensional PPP (Poisson Point Process) having density of $\lambda$ and activity of each of the licensed devices corresponds to $P_{on}$, the number ($\tilde{K}$) of average available channels may be represented by Formula 1 as follows.

$$\tilde{K} = \sum_{k=0}^{M-1} (M-k)e^{-\lambda \pi R^2 P_{on}(k)} \frac{(\lambda \pi R^2 P_{on})^k}{k!} = \quad \text{[Formula 1]}$$

$$\frac{M \cdot \Gamma(M, \lambda \pi R^2 P_{on})}{\Gamma(M)} - \frac{\lambda \pi R^2 P_{on} \cdot \Gamma(M-1, \lambda \pi R^2 P_{on})}{\Gamma(M-1)}$$

In the Formula 1, M means the total number of channels capable of being used by an unlicensed terminal, k means the number of licensed devices existing in an operation range, and R means a radius of the operation range. In the Formula 1, Γ(x) is corresponds to a gamma function for x and may be defined by Formula 2 as follows. [Formula 2]

$$\Gamma(x) = \int_0^\infty t^{x-1} e^{-t} dt$$

In the Formula 1, Γ(x,y) is an incomplete gamma function and may be defined by Formula 3 as follows. [Formula 3]

$$\Gamma(x,y) = \int_y^\infty t^{x-1} e^{-t} dt$$

FIG. 12 is a diagram for a result of simulating the number of available channels according to a configured radius depending on density (λ) of a licensed device. As depicted in FIG. 12, the number of available channels increase as an operation range is set to smaller (narrower) and reduces as the operation range is set to bigger (or wider). The number of available channels directly affects the system performance. The system performance may be enhanced as the number of available channels increases. Hence, as the operation range becomes narrower, the number of available channels increases and the system performance may be enhanced.

In summary, as mentioned in the foregoing description, as a wider operation range is set, time delay of available channel information and an overhead is lowered. Moreover, as a narrower operation range is set, the number of available channels increases. In particular, when an operation range is set, an aspect of lowering the time delay and the overhead and an aspect of increasing the number of available channels are in a trade-off relationship. Hence, a size of the operation range may be set in consideration of a purpose of using available channel information on a plurality of operation ranges, performance limitation of a device, the number of available channels required, and the like. For instance, in case of a device relatively sensitive (i.e., requiring a processing speed of fast or slow) to the time delay and the overhead, it is able to set the operation range as wider as possible. In case of a device requiring more available channels (i.e., requiring a higher service quality), it is able to set the operation range as narrower as possible.

Figure 13:
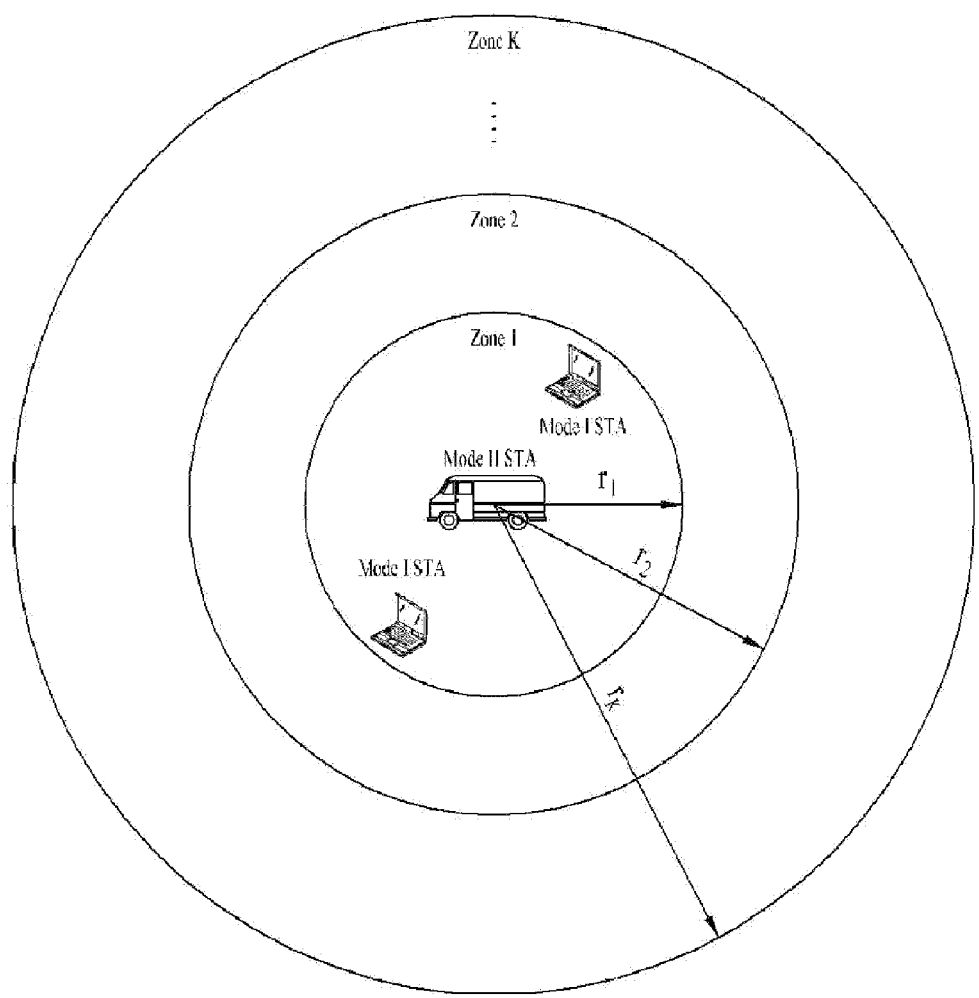
FIG. 13 is a diagram for an example of setting a range of multiple operations.

FIG. 13 is a diagram for an example of setting a range of multiple operations. FIG. 13 may be comprehended as a concrete example of FIG. 5 (b). Referring to FIG. 13, K numbers of multi-operation ranges (zone 1, zone 2, . . . , zone K) may be configured in consideration of mobility of the Mode II (and/or Mode I) STA. Each radius of the K numbers of multi-operation ranges corresponds to $r_1, r_2, \ldots, r_k$, respectively. For instance, an index may be given to the K numbers of multi-operation ranges in an ascending order of the radiuses.

The Mode II STA may request and obtain available channel information on each of a plurality of operation ranges (K numbers) to the GDB. In case that an STA makes a request for WSM (white space map) information or the STA transmits the WSM information to a different STA, a CAQ frame is used. The CAQ frame consists of a plurality of information fields. In order for the Mode II STA to request and obtain the available channel information on each of a plurality of the operation ranges to the GDB, a Mode II CAQ frame newly proposed by the present invention may be used.

FIG. 14 is a diagram for a Mode II CAQ frame. FIG. 14 (a) indicates a legacy CAQ frame and FIG. 14 (b) indicates a new CAQ frame proposed by the present invention.

Among the fields configuring the Mode II CAQ frame in FIG. 14 (a), an Info ID field indicates an identifier of information, a Length field indicates a length of a remaining field of the CAQ frame, a Requester STA Address field indicates an address of an STA making a request for a CAQ, a Responder STA Address field indicates an address of an STA responding to a CAQ, a Reason Result Code field indicates explanation on a CAQ field, a Channel Query Info field indicates a present or non-presence of a device identifier and the number of device location informations, and a Device Class field indicates a class to which a device belongs. And, a Device Location Information field indicates location information on a device. If a CAQ frame is related to a plurality of locations, the Device Location Information field may be repeated. And, a WSM element body fields are fields including channel informations, which configure a WSM.

A legacy CAQ frame structure as depicted in FIG. 14 (a) may be modified into a new CAQ frame structure depicted in FIG. 14 (b). Explanation on the contents duplicated with the content of FIG. 14 (a) is omitted in FIG. 14 (b). Compared to FIG. 14 (a), the Reason Result code field, the Channel Query Info field, the Device Location Information field, and the WSM element body fields may be modified in FIG. 14 (b). In this case, fields in which a direct configuration change occurs correspond to the Reason Result Code field and the Channel Query Info field.

The Reason Result Code field may include information on whether a channel request is successfully performed, whether an operation range request is successfully performed, and the like indicated by an STA receiving a request of WSM information to an STA requesting the WSM information. The present invention proposes to add a new field value indicating whether a request of the WSM information corresponding to a plurality of operation ranges is successfully performed to the Reason Result Code field. By doing so, the Reason Result Code field may be configured by Table 7 as follows.

TABLE 7

| Reason Result Code field value | Description |
| --- | --- |
| 0 | Reserved |
| 1 | Channel Availability List requested |
| 2 | Success with the Available Channel List result for a Device Location Information |
| 3 | Success with an Available Channel List result for a bounded geo-graphic area defined by multiple Device Location Information |
| 4 | Success with an Available Channel List result for multiple bounded geo-graphic areas defined by single Device Location Information with multiple Radius Information |
| 5 | Request declined |
| 6 | Request not successful because of Device ID verification failure |
| 7 | Request not successful as one or more parameters have invalid values |
| 8-255 | Reserved |

According to the examples shown in the Table 7, a value of the Result Code field '4' indicates that the WSM information (available channel list) corresponding to a plurality of operation ranges (e.g., a plurality of operation ranges depicted in FIG. 13), which are defined according to a plurality of radius informations in a single device location, is successfully provided.

Subsequently, as depicted in FIG. 15, a Channel Query Info field is information transmitted by an STA that makes a request for a WSM. This field indicates whether there exist location information of a device and the number of location informations. A field indicating whether a device making a request for a WSM uses multi-operation range may be added to the Channel Query Info field proposed by the present invention. FIG. 15 (a) indicates a configuration of a legacy Channel Query Info field and FIG. 15 (b) indicates a configuration of the Channel Query Info field proposed by the present invention. As depicted in FIG. 15 (b), a field of 1-bit long indicating whether a plurality of operation ranges are used may be added to a B1 field.

By using such a frame structure as a CAQ frame structure depicted in FIG. 14 (b), an STA (e.g., Mode II STA) may make a request for WSM information (available channel information) in a plurality of operation ranges (K number). Having received the WSM information, an STA (e.g., GDB) determines a channel list available in each of a plurality of operation ranges and transmits the available channel list to the STA (e.g., Mode II STA) that made a request for the WSM information.

For instance, when the Mode II STA intends to make a request for an available channel list in a plurality of operation ranges (K number), the Mode II STA may use a CAQ frame structure. Specifically, the Mode II STA indicates whether the multi operation ranges are used and the information on the number of multi operation ranges (i.e., K) using the Channel Query Info field and may transmit K numbers of radius information, which is intended to make a request, to the GDB in a manner of repeating a Device Location information field K times. The GDB may check whether there exist location information, whether the multi operation ranges (or radius information) are used, and how many operation ranges (or radius information) are used via the Channel Query Info field of the CAQ frame transmitted by the Mode II STA. and, the GDB may determine a channel list available in each of a plurality of operation ranges and may transmit a result of the determination to the Mode II STA. The GDB may transmit the available channel list for the multi operation ranges to the Mode II STA using the CAQ frame structure depicted in the example of FIG. 14 (b). Specifically, the Reason Result Code field of the CAQ frame transmitted by the GDB may indicate an operation result for a request and WSM (available channel list) information on each of operation ranges (or each of radiuses) may be transmitted to the Mode II device in a manner of being repeated K times in the WSM element body fields. As mentioned in the foregoing description, when the available channel information on a plurality of the operation ranges (or a plurality of the locations/radiuses) is transceived between the Mode II STA and the GDB, the example of the structure of the Mode II CAQ frame depicted in FIG. 14 may be used for S1002, S1003, and S1008 in FIG. 10 or S1108 and the like in FIG. 11.

Figure 16:
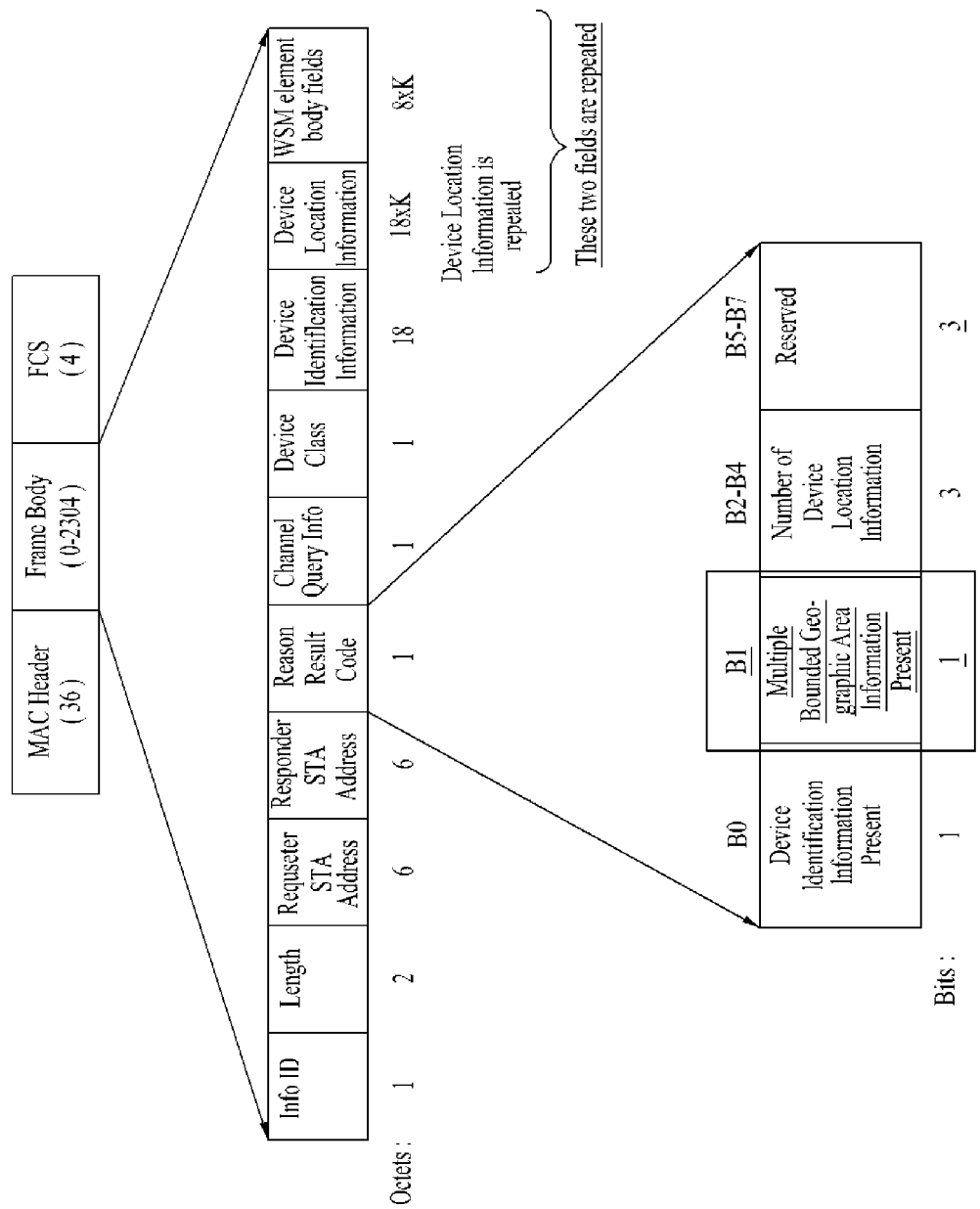
FIG. 16 is a diagram of an MAC frame format for a CAQ according to one embodiment of the present invention.

FIG. 16 is a diagram of an MAC frame format for a CAQ according to one embodiment of the present invention. A MAC header may include a frame control, duration, address, and the like. For instance, the MAC header may have a length of 36 octets. A frame body may include information according to a frame type. The frame body may have a length of 0 to 2304 octets. FIG. 16 shows an example that Device Identification Information Present, Multiple Bounded Geographic Area Information Present, Number of Device Location Information field, and the like are defined in the Reason Result Code field, by which is non-limited. The frame body may be configured by the Mode II CAQ frame structure according to the examples described in FIG. 14 and FIG. 15. Subsequently, an FCS (Frame Check Sequence) includes 32-bit CRC (cyclic redundancy check) and may have a length of 4 octets.

Referring back to the example of FIG. 13, a Mode II device makes a request for available channel information on each of a plurality of operation ranges (K number) to the GDB and may obtain the available channel information on each operation range from the GDB. In this case, if it is assumed that the frame structure of FIG. 16 is used, compared to a case that a single operation range (e.g., a zone 1) including a radius of $r_1$ is used, when K number of operation ranges of maximum radius $r_K$ are used, an overhead (R) may be represented as Formula 4 as follows.

$$R = \frac{(75 + 13K)r_1}{88r_K} \qquad \text{[Formula 4]}$$

Such a process of concluding an overhead (R) as Formula 4 is described in detail in the following description. Information quantity of a MAC frame (refer to FIG. 16) for a CAQ consists of a MAC header (36 octets)+a Frame Body (0~2304 octets)+an FCS (4 octets). Information quantity of Info ID to Device Identification Information field, which correspond to the remaining fields except the location information and the WSM information field in the Frame Body, is an Info ID (1 octet)+a Length (2 octets)+a Requester STA Address (6 octets)+a Responder STA Address (6 octets)+a Channel Query Info (1 octet)+a Device Class (1 octet)+a Device Identification Information (18 octets)=35 octets. In particular, among the Info ID to the Device Identification Information fields, a length of the remaining fields except the Reason Result Code field may become the total of 35 octets. Hence, the MAC header (36 octets)+the FCS (4 octets)+{Info ID to Responder STA address, Channel Query Info to Device Identification Information} of the Frame Body (35 octets) equals to 75 octets.

As mentioned in the foregoing description, when a basic overhead in a CAQ MAC frame corresponds to 75 octets, if a Mode II device makes a request for channel information in a single location (i.e., K=1), 18 octets corresponding to the Device Location Information field are added. Hence, a required information quantity becomes 75+18=93 octets. If the GDB sends available channel information, 8 octets corresponding to the WSM element body field are added. Hence, an overhead becomes 75+8=83 octets. In particular, in case of K=1, an average overhead of the overhead (=93) of a CAQ request and the overhead (=83) of a CAQ response becomes 88 octets (=(93+83)/2). And, in case of calculating an overhead of CAQ request/response for K number of locations, the CAQ request may have 75+18K overhead and the CAQ response may have 75+8K overhead. Moreover, in case of calculating an average overhead of the overhead of the CAQ request and the overhead of the CAQ response, since an average of 18K and 8K corresponds to 13K, the average overhead of the CAQ request/response may become 75+13K. Hence, compared to 88 octets, which is the overhead for a single operation range of $r_1$ radius, the overhead for the K number of operation ranges in $r_1$ radius may be represented by the aforementioned Formula 4.

For instance, if an overhead compares on the basis of a case that $r_1$ equals to 500 meters, when a single operation range of a radius of 100 meters is used, R becomes 5 (i.e., an overhead of 5 times compared to the case of the $r_1$). When a single operation range of a radius of 500 meters is used, R becomes 1 (i.e., an overhead identical to the case of the $r_1$). When operation ranges (K=3) of a maximum radius of 500 meters are used, R becomes 1.3 (i.e., an overhead of 1.3 times compared to the case of the $r_1$).

As mentioned in the foregoing description, when the Mode II STA has obtained available channel information on multi operation ranges (or a plurality of locations) from the GDB, the Mode I STA may obtain the available channel information on the multi operation ranges from the Mode II STA. The Mode I CAQ and CVS process may be performed via the CAQ request/response process of FIG. 10 or FIG. 11 (S1001, S1004, S1010, and S1011 of FIG. 10, S1101, S1102, and S1109 of FIG. 11) and the CVS process (S1005, S1007, and S1010 of FIG. 10, S1103, S1105, and S1107 of FIG. 11) and the CVS process (S1005, S1007, and S1010 of FIG. 10, S 1103, S 1105, and S1107 of FIG. 11) using the CAQ frame structure of FIG. 8 and the CVS frame structure of FIG. 9. An operation of the Mode I STA is explained in detail in the following description.

Figure 17:
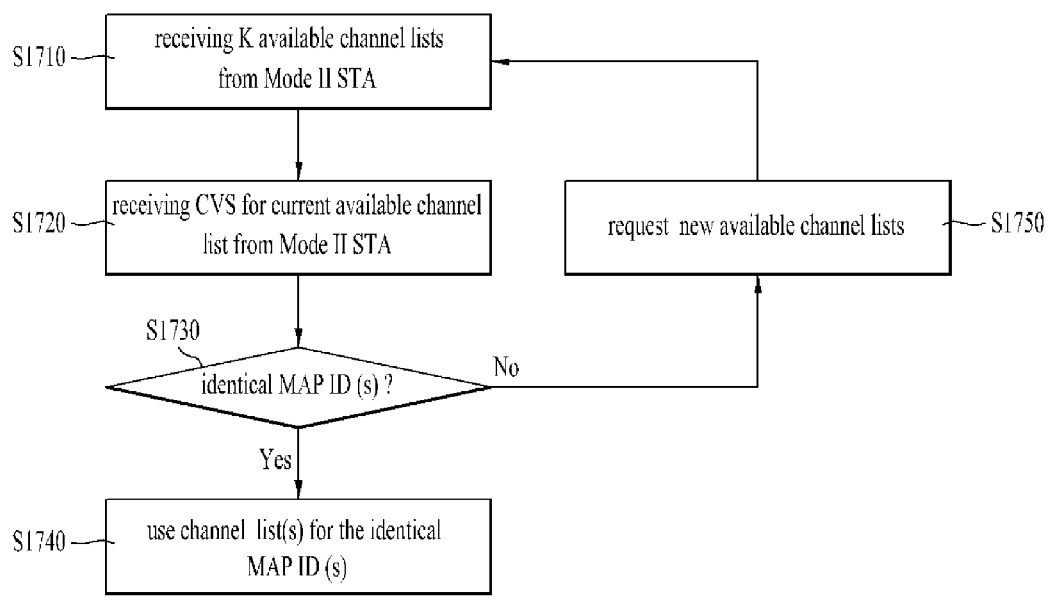
FIG. 17 is a flowchart for explaining a method for a Mode I STA according to one embodiment of the present invention to use available channel information.

FIG. 17 is a flowchart for explaining a method for a Mode I STA according to one embodiment of the present invention to use available channel information. A main agent of performing each of the steps depicted in FIG. 17 is a Mode I STA.

In the step S1710, the Mode I STA may receive K number of available channel lists from the Mode II STA. The step S1710 may correspond to a step of receiving a Mode I CAQ response message. Specifically, the Mode II STA may transmit an available channel list to the Mode I STA based on a plurality (K number) of WSM information (WSM information on each of K number of operation ranges) received from the GDB. In this case, K number of available channel lists, which are obtained from the GDB by the Mode II STA, may be received via a Mode I CAQ frame (e.g. as mentioned earlier in FIG. 8, the available channel list is repeated K times) from the Mode II STA irrespective of a location of the Mode I STA (or without location information).

In the step S1720, the Mode I STA may receive information on a currently available channel list from the Mode II STA. The step S1720 may correspond to a step of receiving a CVS. Specifically, having received K number of available channel lists for K number of operation ranges, the Mode I STA may check validity of the K number of channel lists via a CVS from the Mode II STA. In particular, the CVS is a signal transmitted to the subordinative Mode I STA by the enabling Mode II STA. The Mode I STA may check a practically available channel list in a current location of the Mode I STA via the CVS. If there exist a plurality of MAP IDs (if there exist a plurality of WSM information (available channel lists) available in the current location, a plurality of MAP IDs), which correspond to WSM information available in the current location of the Mode I STA, the Mode I STA may periodically receive the CVS signal including a plurality of the MAP IDs from the Mode II STA.

In the step S1703, the Mode I STA may compare the MAP ID of each of the K number of available channel lists received from the Mode II STA via the CAQ response in the step S1710 with the MAP ID received from the Mode II STA via the CVS. Among the K number of MAP IDs, if there exist at least one MAP ID matched with the MAP ID received via the CVS (i.e., if a result of the step S1730 is YES), the Mode I STA may perform a communication in a TVWS using a channel corresponding to the channel list for the at least one matched MAP ID. Meanwhile, among the K number of MAP IDs, if there is no MAP ID matched with the MAP ID received via the CVS (i.e., if a result of the step S1730 is NO), proceeds to the step S1750.

In the step S1750, the Mode I STA may transmit a Mode I CAQ request message requesting an available channel list for the K number of operation ranges to the Mode II STA. The Mode I STA may receive a Mode I CAQ response message from the Mode II STA in response to the Mode I CAQ request message.

As mentioned in the foregoing description, according to one example of a method of setting multiple operation ranges of the present invention, a maximum radius may be configured as wider as possible and a plurality (K number) of operation ranges (e.g., a plurality of radiuses) may be configured in the maximum radius. When the Mode II (or the Mode I) STA performs an operation of requesting/obtaining available channel information, if the multi operation ranges are configured by the aforementioned method, the available channel information may be more efficiently and precisely provided/used. Specifically, if the maximum radius of the multi operation ranges is set to be wider, frequency (or probability) of getting out of an operation range of an STA is reduced. Hence, frequency of a CAQ operation between the STA and the GDB or frequency of the CAQ operation between the Mode II STA and the Mode I STA is reduced compared to a case of using a single operation range including a smaller radius. And, since the available channel list is provided and obtained for each of the operation ranges, which are subdivided into a plurality of radiuses in the maximum radius, the more number of available channels may be used compared to a case that a single operation range of a large radius is used. Hence, in terms of the number of uses of the available channel, the channel may be efficiently used.

Figure 18:
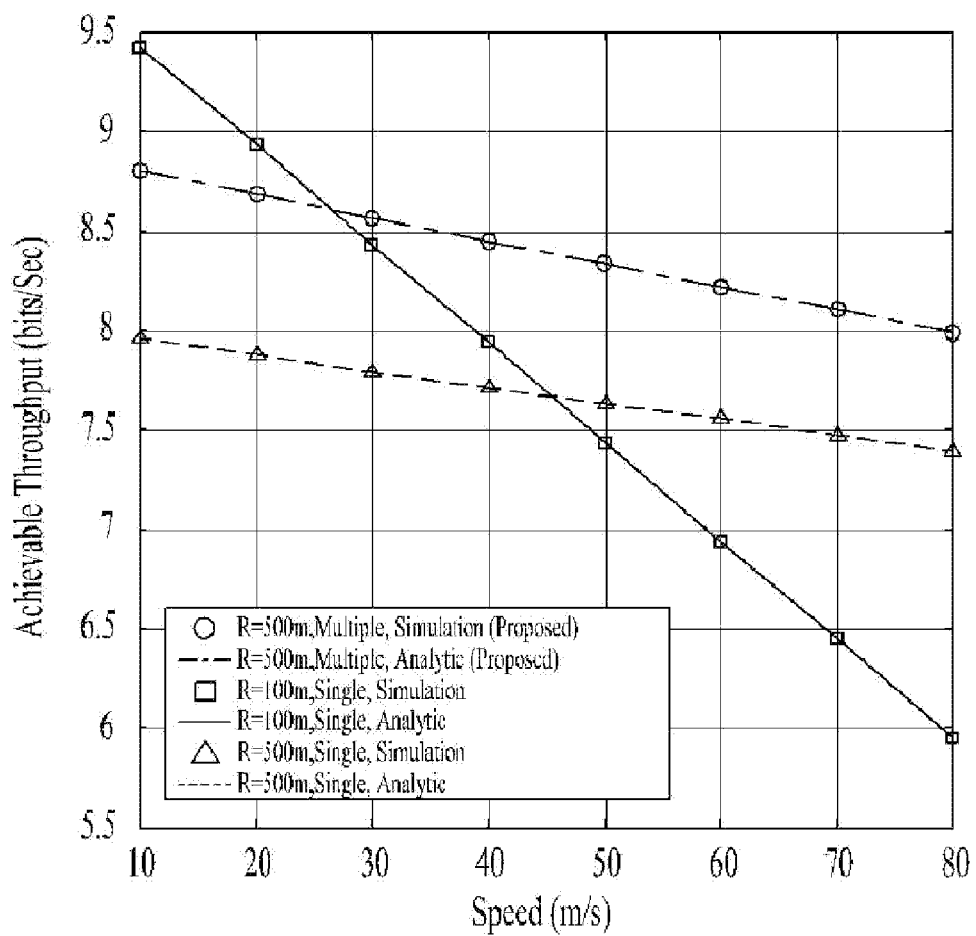
FIG. 18 is a diagram for throughputs in case that multi operation ranges are set according to one embodiment of the present invention.

FIG. 18 is a diagram for throughputs in case that multi operation ranges are set according to one embodiment of the present invention. FIG. 18 indicates a result of simulating achievable throughputs for a moving speed of an STA according to cases including a case of a single operation range where a radius (R) equals to 500 meters, a case of a single operation range where a radius (R) equals to 100 meters, and a case of multi operation ranges where a radius (r) equals to 500 meters. In FIG. 18, when the case of a single operation range where a radius (R) equals to 500 meters is compared with the case of multi operation ranges where a radius (r) equals to 500 meters, it is able to know that the achievable throughput in the multi operation ranges is high in both a low speed and a high speed. And, in FIG. 18, it is able to know that the achievable throughput in the single operation range where the radius (R) equals to 100 meters is little bit higher than the achievable throughput in the multi operation ranges where the radius (R) equals to 500 meters in a low speed of the STA. Yet, it is able to know that the achievable throughput in the single operation range where the radius (R) equals to 100 meters is lower than the achievable throughput in the multi operation ranges where the radius (R) equals to 500 meters in case that a speed of the STA is faster than 26 m/s. Hence, in general, it is more beneficial to set a maximum radius bigger and to set a plurality of operation ranges in the maximum radius compared to a case of setting a single operation range. In particular, when a single operation range is used, if a radius is set to be small, time delay and a signal overhead occur due to frequent CAQ frame transmission and reception. If a radius is set to be big, the number of available channels may be reduced. Hence, in terms of a channel use, the time delay, and the signal overhead, communication performance may be enhanced in a manner of dividing a range into a plurality of operation ranges within a big operation range.

Meanwhile, a scheme of setting multiple operation ranges to which a principle of the present invention is applied may be non-limited to the example of FIG. 13. Although the example of FIG. 13 explains that a plurality of operation ranges are set using a plurality of radius information different from each other on the basis of a center point (or a current location) to simply configure the multi operation ranges, it is an example only to which the present invention is applied. Although the multi operation ranges are set by various schemes except the scheme of setting the multi operation ranges, the scheme of transmitting/receiving a CAQ and a principle of the scheme of transmitting/receiving a CAQ proposed by the present invention may be identically applied thereto.

Figure 19:
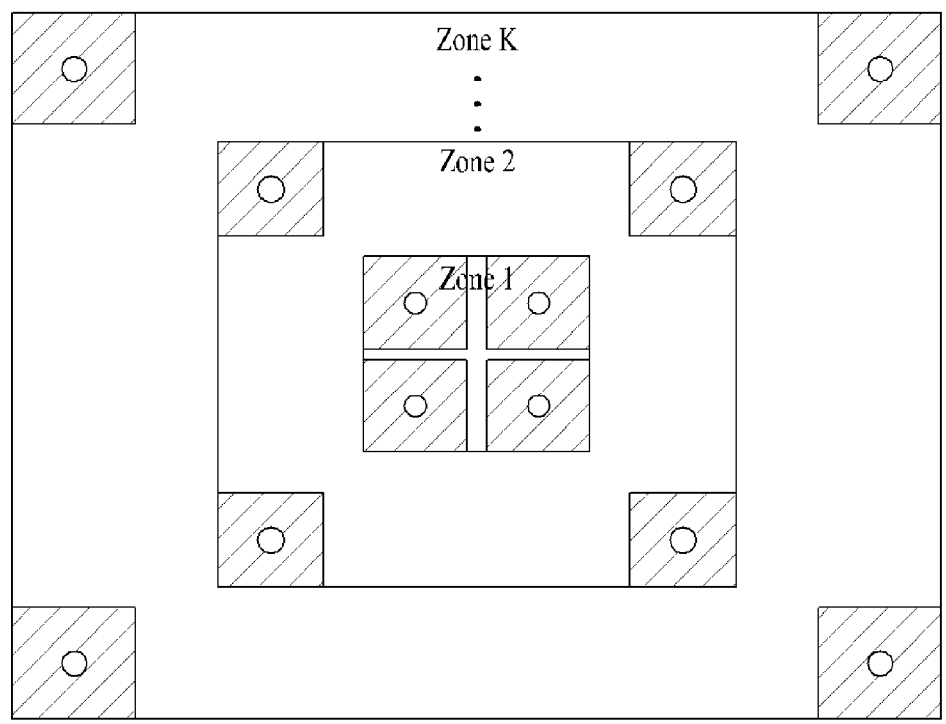
FIG. 19 is a diagram for a different example of setting multi operation ranges.

FIG. 19 is a diagram for a different example of setting multi operation ranges. A plurality of operation ranges may be configured in a manner of extending setting a single operation range using a legacy multiple geographical locations. This sort of operation range configuration may have a different overhead required to form an operation range in accordance with how to configure an operation range. According to the example of FIG. 19, since maximum 8 location informations are used to configure a single operation range, information quantity required to configure an operation range increases compared to a method of using single location information and a radius information. Although configuration of the multi operation ranges depicted in FIG. 19 is more complex than the example of FIG. 13, the configuration may more precisely reflect anticipated moving path of each STA in practical. For instance, in case of not a randomly moving STA but an STA repeatedly moving according to a designated path, it is more suitable to configure an operation range of a polygon form instead of a circle form for a form of the anticipated moving path of the STA. By doing so, unnecessary available channel information, which is irrelevant to the anticipated moving path of the STA, is not included in the operation range, thereby reducing the CAQ overhead.

As mentioned in the foregoing description, the multi operation ranges may be configured by various schemes. After the multi operation ranges are configured, the aforementioned Mode II CAQ request/response, the Mode I CAQ request/response, and the CVS transmission and reception may be performed.

Figure 20:
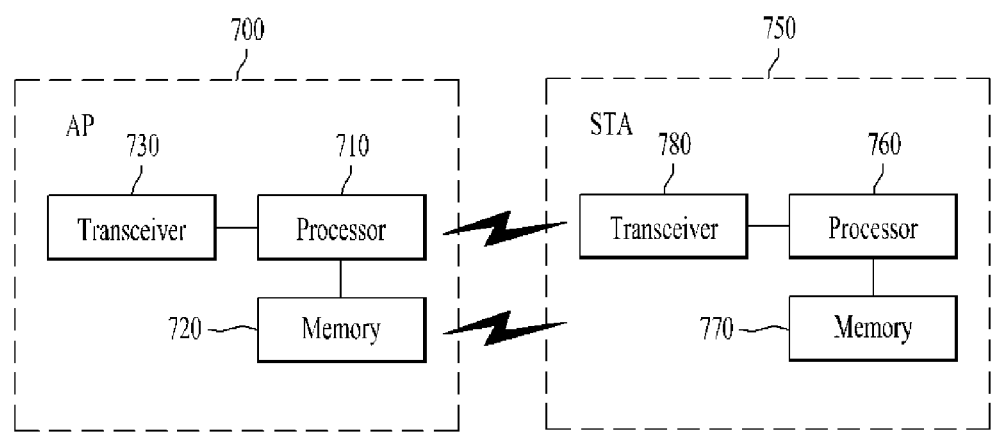
FIG. 20 is a block diagram for a configuration of a wireless device according to one embodiment of the present invention.

FIG. 20 is a block diagram for a configuration of a wireless device according to one embodiment of the present invention.

An AP 700 may include a processor 710, a memory 720, and a transceiver 730. An STA 750 may include a processor 760, a memory 770, and a transceiver 780. The transceiver 730/780 may transmit/receive a radio signal. For instance, the transceiver may implement a physical layer according to an IEEE 802 system. The processor 710/760 may implement a physical layer and/or a MAC layer according to an IEEE 802 system in a manner of being connected to the transceiver 730/780. The processor 710/760 may configure/comprehend a CAQ frame format and a CVS IE format according to the aforementioned various embodiments of the present invention and may be configured to perform a radio communication in a white space band via the transceiver 730/780 using an available channel list. And, a module for implementing the operation of the AP and the STA according to the aforementioned various embodiments of the present invention is stored in the memory 720/770 and may be executed by the processor 710/760. The memory 720/770 is included in the inside of the processor 710/760 or is installed in the external of the processor 710/760. The memory may be connected to the processor 710/760 by a well-known means.

Figure 21:
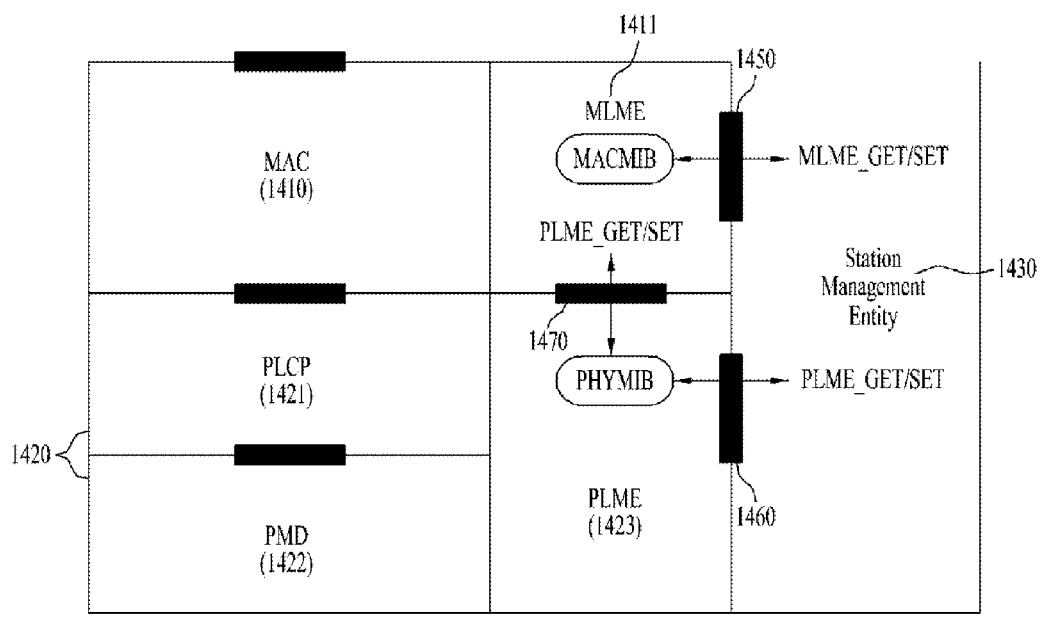
FIG. 21 is a diagram for explaining a detail configuration of a processor of a wireless device according to one embodiment of the present invention.

FIG. 21 is a diagram for explaining a detail configuration of a processor of a wireless device according to one embodiment of the present invention.

The processor 710/760 depicted in FIG. 20 may have a multi-layer structure. Among the multi-layer structure, FIG. 21 mainly concerns a MAC sublayer 1410 and a physical layer 1420 on a data link layer (DLL).

As depicted in FIG. 21, the PHY 1420 may include a PLCP (physical layer convergence procedure) entity 1421 and a PMD (physical medium dependent) entity 1422. Both the MAC sublayer 1410 and the PHY 1420 may conceptually include management entities called an MLME (MAC sublayer management entity) 1411 and a PLME (physical layer management entity) 1423. The MLME 1411 and the PLME 1423 may provide each layer with a layer management service interface (by using this, layer management function is performed).

In order to provide a proper MAC operation, an SME (station management entity) 1430 exists in each STA. The SME 1430 is a layer-independent entity. The SME may exist in a separate management plane or may be seen as being apart from the separate management plane. Although detail function of the SME 1430 is not described in the present specification, the SME 1430 collects layer-dependent status from various layer management entities and takes a charge of such a function as configuring values of layer-specific parameters similar to each other. The SME 1430 is a general system management entity, performs a role of the general system management entity, and may implement a standard management protocol.

Various entities depicted in FIG. 21 may interact with each other with various schemes. FIG. 21 shows several example of exchanging GET/SET primitives. An XX-GET.request primitive may be used to make a request for a given value of MIBattribute (management information base attribute). An XX-GET.confirm primitive is used to return an appropriate MIBattribute value in case that its status field corresponds to 'SUCCESS'. Otherwise, the XX-GET.confirm primitive may be used to return an error indication to its status field. An XX-SET.request primitive may be used to request that an indicated MIBattribute is set to a prescribed value. If the MIBattribute means a specific operation, the XX-SET.request requests the specific operation to be performed. An XX-SET.confirm primitive is used to confirm that an indicated MIBattribute is set by a requested value in case that its status field corresponds to 'SUCCESS'. Otherwise, the XX-GET.confirm primitive may be used to return an error indication to its status field. If the MIBattribute means a specific operation, the XX-SET.confirm primitive may be used to confirm that the specific operation is performed. As depicted in FIG. 21, various PLME$_{13}$ GET/SET primitives are exchanged via a PLME_SAP 1460 between the PLME 1423 and the SME 1430 and may be exchanged via a MLME-PLME_SAP 1470 between the MLME 1411 and the PLME 1470.

Embodiments of the present invention may be implemented using various means. For instance, embodiments of the present invention may be implemented using hardware, firmware, software and/or any combinations thereof.

In the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention may be implemented by modules, procedures, and/or functions for performing the above-explained functions or operations. Software code is stored in a memory unit and is then drivable by a processor. The memory unit is provided within or outside the processor to exchange data with the processor through the various means known in public.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations may be made therein without departing from the spirit and scope of the invention. For instance, those skilled in the art may use each component described in the aforementioned embodiments in a manner of combining it with each other. Hence, the present invention may be non-limited to the aforementioned embodiments of the present invention and intends to provide a scope matched with principles and new characteristics disclosed in the present invention.

INDUSTRIAL APPLICABILITY

Although various embodiments of the present invention are described in a manner of mainly concerning IEEE 802.11 system, the embodiments may be applied to various mobile communication systems where a non-licensed device may perform a channel availability query in a whitespace band in the same manner.

What is claimed is:

1. A method of receiving available channel information on K (K≥2) numbers of locations by a first type station (STA) from a second type STA in a wireless communication system, comprising:
receiving a channel availability query (CAQ) response message, wherein the CAQ response message includes a field of the numbers (K) of the locations and K numbers of available channel list fields configured with information on an available channel list for each of the K numbers of locations, from the second type STA;
performing a communication in a white space using an available channel included in an available channel list for a single location among the K numbers of locations, wherein the K numbers of available channel list fields are configured with a Map ID field and a field of N (N≥1) numbers of available channels are repeated K times; and
receiving a contact verification signal (CVS) including one or more Map ID fields from the second type STA by the first type STA,
wherein, if the first type STA receives the CVS within a predetermined time interval (CVSTimeInterval), an available channel list corresponding to a Map ID included in the received CVS is used only by the first type STA among available channel lists included in the CAQ response message.

2. The method of claim 1, wherein an available channel list corresponding to a Map ID, which is not matched with a Map ID included in the received CVS, is discarded by the first type STA among available channel lists included in the CAQ response message.

3. The method of claim 1, wherein if there is no Map ID matched with a Map ID included in the received CVS among available channel lists included in the CAQ response message, the first type STA transmits a new CAQ request message to the second type STA.

4. The method of claim 1, wherein a value of the Map ID is sequentially given to different available channel lists.

5. The method of claim 1, wherein if a value of the Map ID field corresponds to 0, modification of the available channel information is indicated.

6. The method of claim 1, wherein the field of the N numbers of available channels is configured with a channel number field, a maximum power level field, and a validity field are repeated N times.

7. The method of claim 1, wherein the second type STA obtains the available channel information on the K numbers of locations from a geo-location data base.

8. The method of claim 1, wherein the available channel information on the K numbers of locations is contained in an anticipated moving path of the second type STA.

9. The method of claim 1, wherein the CAQ response message corresponds to either a response message for a CAQ request message transmitted by the first type STA or an unsolicited response message.

10. The method of claim 1, wherein the K numbers of locations are configured by K numbers of operation ranges containing an identical center point and K numbers of different radius information.

11. A method of transmitting available channel information on K (K≥2) numbers of locations by a second type station (STA) to a first type STA in a wireless communication system, comprising:
generating a channel availability query (CAQ) response message, wherein the CAQ response message includes a field of the numbers (K) of the locations and K numbers of available channel list fields configured with information on an available channel list for each of the K numbers of locations;
transmitting the generated CAQ response message to the first type STA,
wherein the K numbers of available channel list fields are configured with a Map ID field and a field of N (N≥1) numbers of available channels are repeated K times; and
transmitting a contact verification signal (CVS) including one or more Map ID fields to the first type STA by the second type STA,
wherein, if the second type STA transmits the CVS within a predetermined time interval (CVSTimeInterval), an available channel list corresponding to a Map ID included in the transmitted CVS is used only by the first type STA among available channel lists included in the CAQ response message.

12. A first type station (STA) device receiving available channel information on K (K≥2) numbers of locations from a second type STA in a wireless communication system, comprising:
a transceiver configured to receive a channel availability query (CAQ) response message, wherein the CAQ response message includes a field of the numbers (K) of the locations and K numbers of available channel list fields configured with information on an available channel list for each of the K numbers of locations, from the second type STA,
wherein the transceiver further configured to receive a contact verification signal (CVS) including one or more Map ID fields from the second type STA by the first type STA, and
wherein, if the first type STA receives the CVS within a predetermined time interval (CVSTimeInterval), an available channel list corresponding to a Map ID included in the received CVS is used only by the first type STA among a available channel lists included in the CAQ response message; and a processor configured to perform a communication in a white space using an available channel included in an available channel list for a single location among the K numbers of locations, wherein the K numbers of available channel list fields are configured with a Map ID field and a field of N (N≥1) numbers of available channels are repeated K times.

13. A second type station (STA) transmitting available channel information on K (K≥2) numbers of locations to a first type STA in a wireless communication system, comprising:

a processor configured to:
  generate a channel availability query (CAQ) response message, wherein the CAQ response message includes a field of the numbers (K) of the locations and K numbers of available channel list fields configured with information on an available channel list for each of the K numbers of locations, transmit the generated CAQ response message to the first type STA via a transceiver, wherein the K numbers of available channel list fields are configured with a Map ID field and a field of N (N≥1) numbers of available channels are repeated K times, and transmit a contact verification signal (CVS) including one or more Map ID fields to the first type STA by the second type STA, wherein, if the second type STA transmits the CVS within a predetermined time interval (CVSTimeInterval), an available channel list corresponding to a Map ID included in the transmitted CVS is used only by the first type STA among available channel lists included in the CAQ response message.

* * * * *